(12) United States Patent
Ghosh et al.

(10) Patent No.: US 10,080,219 B2
(45) Date of Patent: Sep. 18, 2018

(54) UPLINK SOUNDING IN WIRELESS NETWORKS

(71) Applicant: Intel Corporation, Santa Clara, CA (US)

(72) Inventors: Chittabrata Ghosh, Fremont, CA (US); Yaron Alpert, Hod Hasharoni (IL); Ziv Avital, Haifa (IL); Avi Mansour, Haifa (IL)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 15/200,387

(22) Filed: Jul. 1, 2016

(65) Prior Publication Data

US 2017/0245246 A1    Aug. 24, 2017

Related U.S. Application Data

(60) Provisional application No. 62/299,105, filed on Feb. 24, 2016.

(51) Int. Cl.
*H04W 72/04*   (2009.01)
*H04L 5/00*    (2006.01)
*H04W 84/12*   (2009.01)

(52) U.S. Cl.
CPC ........ *H04W 72/042* (2013.01); *H04L 5/0023* (2013.01); *H04W 72/0413* (2013.01); *H04W 84/12* (2013.01)

(58) Field of Classification Search
CPC ........... H04W 72/042; H04W 72/0413; H04W 84/12; H04L 5/0023
See application file for complete search history.

(56) References Cited

U.S. PATENT DOCUMENTS

| | | | |
|---|---|---|---|
| 2016/0165589 A1* | 6/2016 | Chu | H04L 5/0007 370/329 |
| 2016/0262051 A1* | 9/2016 | Merlin | H04L 5/0057 |
| 2016/0278081 A1* | 9/2016 | Chun | H04W 74/08 |

* cited by examiner

*Primary Examiner* — Walli Butt
(74) *Attorney, Agent, or Firm* — Schwegman Lundberg & Woessner, P.A.

(57) ABSTRACT

Apparatuses, computer readable media, and methods for uplink sounding in wireless networks are disclosed. An apparatus of a wireless device may include processing circuitry configured to: encode an uplink sounding trigger element (USTE) for one or more stations, the USTE comprising one or more uplink (UL) resource allocations for the one or more stations to transmit one or more uplink sounding referee elements (USREs) to the wireless device. The processing circuitry may be further configured to configure the wireless device to transmit the USTE to the one or more stations, and decode the one or more USREs from the one or more station, wherein the one or more USREs are to be received by the wireless device in accordance with a corresponding resource allocation indicated in the USTE.

19 Claims, 19 Drawing Sheets

UPLINK SOUNDING IN WIRELESS NETWORKS

PRIORITY CLAIM

This application claims the benefit of priority under 35 USC 119(e) to U.S. Provisional Patent Application Ser. No. 62/299,105, filed Feb. 24, 2016, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards, Some embodiments relate to IEEE 802.11ax. Some embodiments relate to methods, computer readable media, and apparatuses for uplink sounding in wireless networks.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
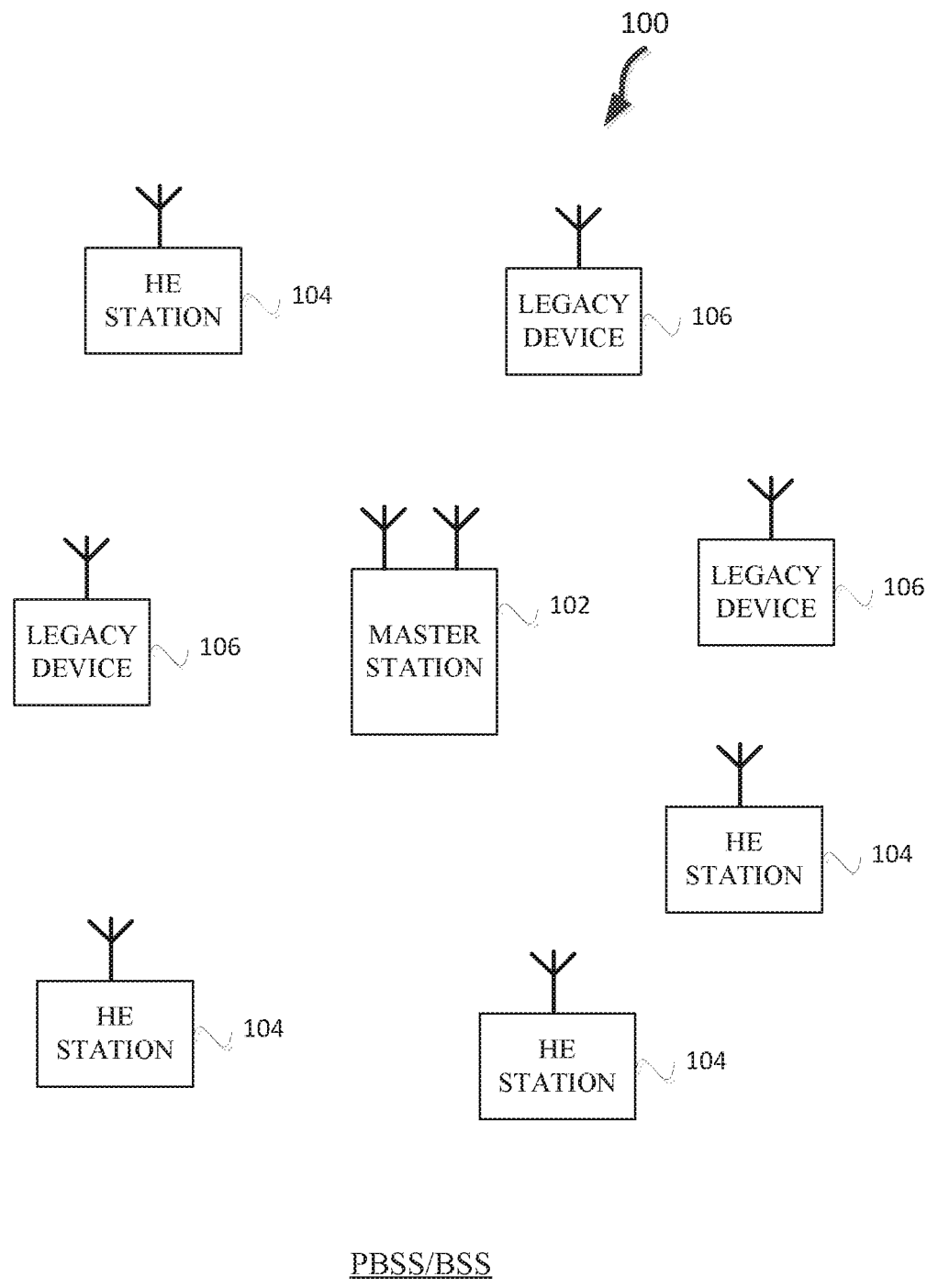
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an access point (AP), a plurality of high-efficiency (HE) (e.g., IEEE 802.11ax) stations 104, and a plurality of legacy (e.g., IEEE 802.11n/ac) devices 106.

The master station 102 may be an AP using one of the IEEE 802.11 protocols to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 and/or HE station 104 may use one or both of MU-MIMO and OFDMA. There may be more than one master station 102 that is part of an extended service set (ESS). A controller (not illustrated) may store information that is common to the more than one master station 102. The controller may have access to an external network such as the Internet, The legacy devices 106 may operate in accordance with one or more of IEEE 802.11 a/b/g/n/ac/ad/af/ah/aj, or another legacy wireless communication standard. The legacy devices 106 may be STAs or IEEE 802.11 STAs. The HE stations 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol such as IEEE 802.11az. In some embodiments, the HE stations 104, master station 102, and/or legacy devices 106 may be termed wireless devices. In some embodiments the HE station 104 may be a "group owner" (GO) for peer-to-peer modes of operation where the HE station 104 may perform some operations of a master station 102.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used. In some embodiments, the OFDMA structure consists of a 26-subcarrier resource unit (RU), 52-subcarrier RU, 106-subcarrier RU, 242-subcarrier RU, 484-subcarrier RU and 996-subcarrier RU. Resource allocations for single user (SU) consist of a 242 subcarrier RU, 484-subcarrier RU, 996-subcarrier RU and 2×996-subcarrier RU.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 102, HE station 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LIE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. in some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and channel information. During the HE control period, HE stations 104 may communicate with the master station 102 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate a portions of the TXOP that are contention based for some HE station 104 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the device 104 and/or the master station 102 are configured to perform the methods and operations herein described in conjunction with FIGS. 1-20.

Figure 2:
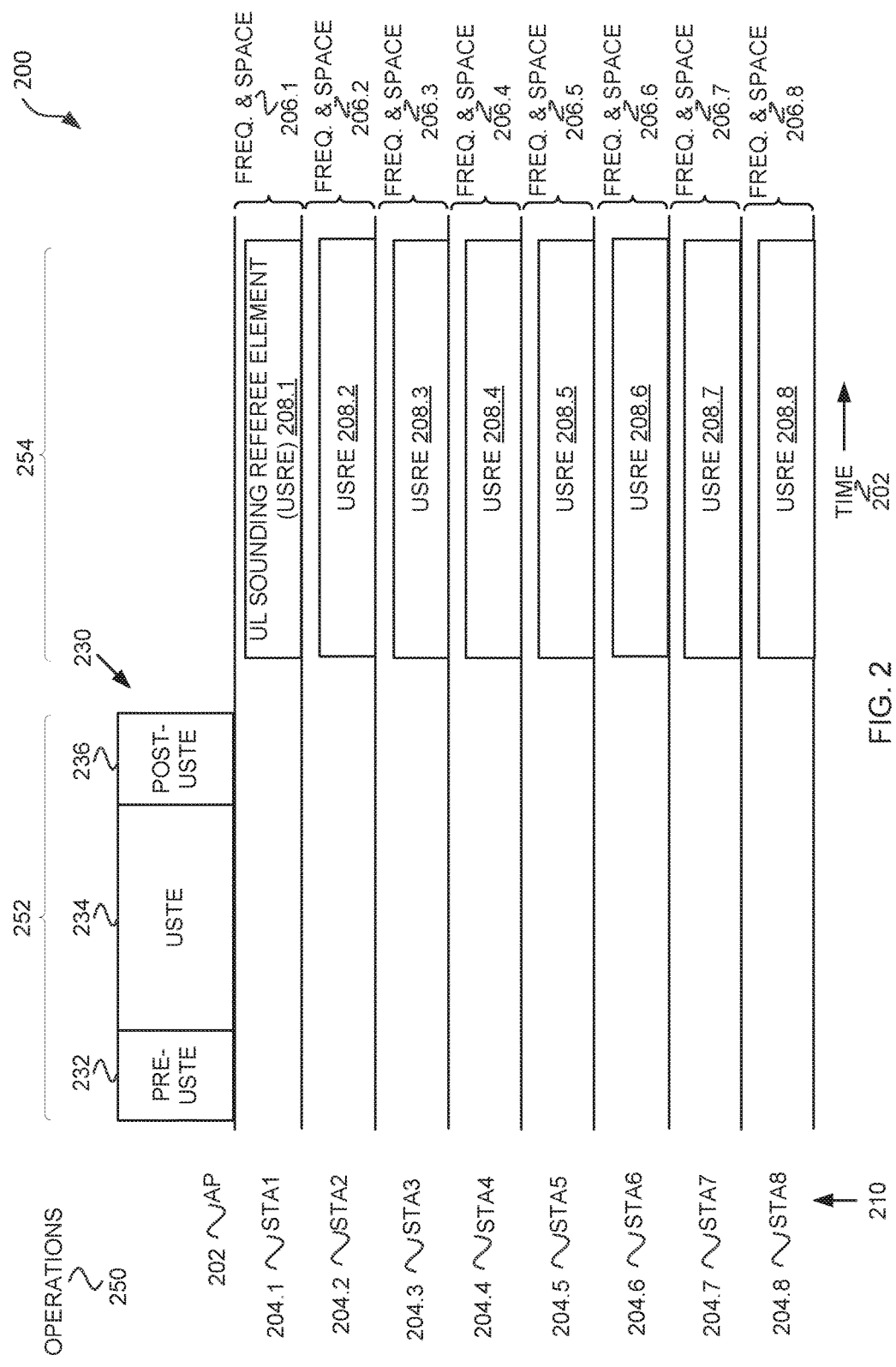
FIG. 2 illustrates a block diagram of a method for uplink sounding in accordance with some embodiments.

FIG. 2 illustrates a block diagram of a method 200 for uplink sounding in accordance with some embodiments. Illustrated in FIG. 2 is time 202 along a horizontal axis, frequency and space 206 along a vertical axis, transmitters 210, and operations 250.

The AP 202 may be a master station 104. The STAs 204 may be HE stations 104. The method 200 may begin with the AP 202 contending for the wireless medium (not illustrated). The method 200 continues at operation 252 with the AP 202 transmitting frame 230. Frame 230 may include a USTE 234, pre-USTE 232, and post-USTE 236. The USTE 234 may be a USTE 900, 1000, in accordance with some embodiments. The USTE 234 may be a frame in accordance with some embodiments. The USTE 234 may be a sounding information element (IE), in accordance with some embodiments. The USTE 234 may be part of another IE or another dedicated frame in accordance with some embodiments. Pre-USTE 232 may be null data packet announcement (NDP-A) packet or another packet or portion of a packet. Post-USTE 236 may be a null data packet (NDP) or another packet or portion of a packet. The USTE 234 may include a USREI that indicates that each STA1 204.1 through STA8 204.8 is to transmit a USRE 1300 on a corresponding frequency 206.

The method 200 continues at operation 254 with the STAs 204. transmitting USREs 208. The STAs 204 transmit the USREs 208 in accordance with the USTE 234. In some embodiments, one or more of the STAs 204 may transmit the USREs 208 on two or more spatial streams. The USRE 208 may be, for example, long-training fields (LTFs). In some embodiments, the USRE 208 may be NDPs. The USREs 208 may be an embodiment of USREs 1300 as disclosed in conjunction with FIG. 13. The AP 202 receives the USREs 208 and may determine channel quality for the STAs 204. The AP 202 may use the channel quality to determine channels to assign STAs 204 to for MU UL and/or MU DL transmission.

Figure 3:
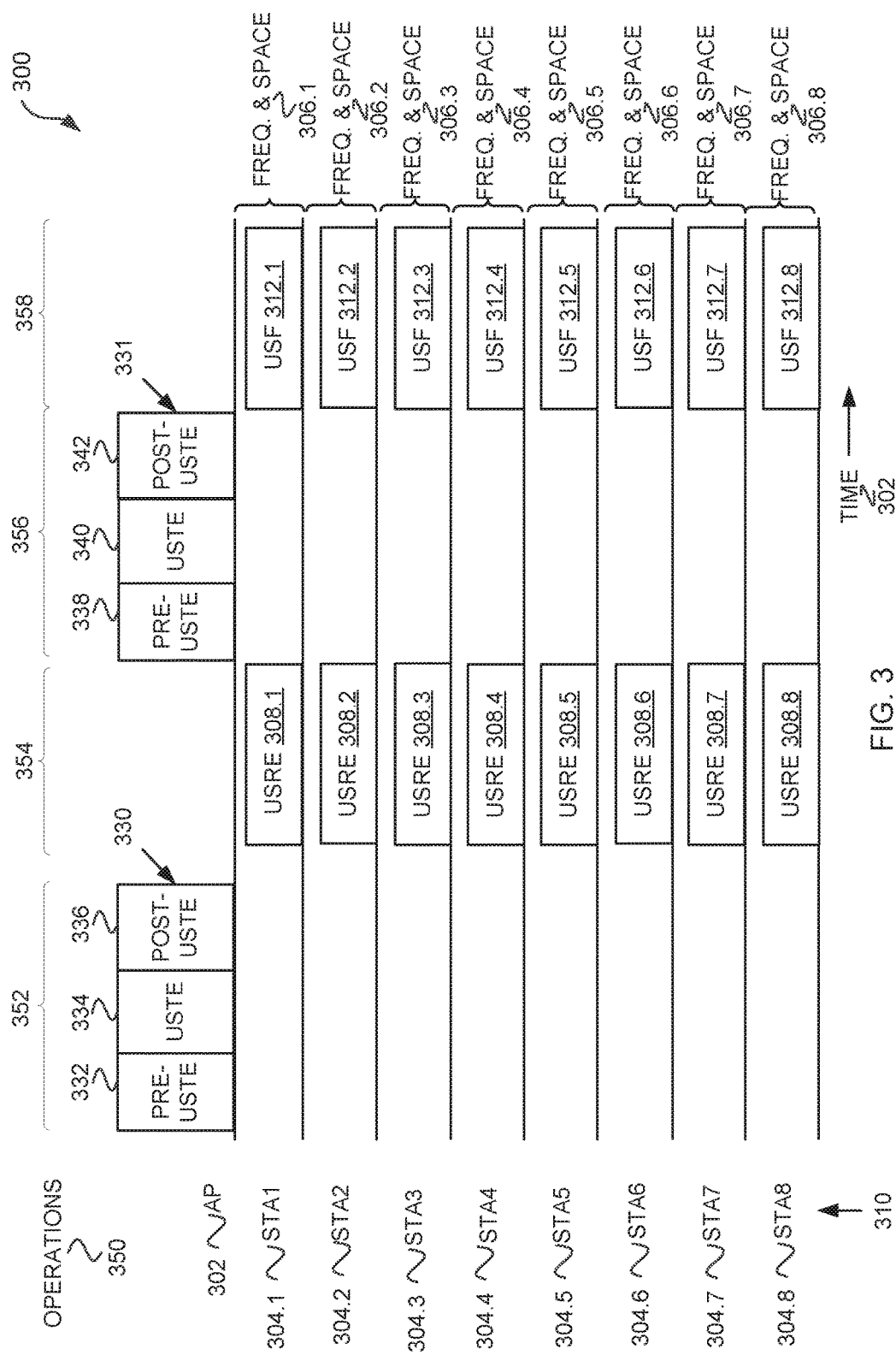
FIG. 3 illustrates a block diagram of a method for uplink sounding in accordance with some embodiments.

FIG. 3 illustrates a block diagram of a method 300 for uplink sounding in accordance with some embodiments. Illustrated in FIG. 3 is time 302 along a horizontal axis, frequency and space 306 along a vertical axis, transmitters 310, and operations 350.

The AP 302 may be a master station 104. The STAs 304 may be HE stations 104. The method 300 may begin with the AP 302 contending for the wireless medium (not illustrated). The method 300 continues at operation 352 with the AP 302 transmitting frame 330. Frame 330 may include a USTE 334, pre-USTE 332, and post-USTE 336. The USTE 334 may be a USTE 900, 1000, in accordance with some embodiments. The USTE 334 may be a frame in accordance with some embodiments, The USTE 334 may be a sounding IE, in accordance with some embodiments. The USTE 334 may be part of another IE or another dedicated frame in accordance with some embodiments. Pre-USTE 332 may be null data packet announcement (NDP-A) packet or another packet or portion of a packet. Post-USTE 336 may be a null data packet (NDP) or another packet or portion of a packet. The USTE 334 may include a USREI that indicates that each STA1 304.1 through STA8 304.8 is to transmit a USRE 1300 on a corresponding frequency 306.

The method 300 continues at operation 354 with the STAs 304 transmitting USREs 308. The STAs 304 transmit the USREs 308 in accordance with the USTE 334. In some embodiments, one or more of the STAs 304 may transmit the USREs 308 on two or more spatial streams. The USRE 308 may be, for example, long-training fields (LTFs). In some embodiments, the USRE 308 may be NDPs. The USREs 308 may be an embodiment of USREs 1300 as disclosed in conjunction with FIG. 13. The AP 302 receives the USREs 308 and may determine channel quality for the STAs 304.

The method 300 may continue at operation 356 with the AP 302 transmitting frame 331. Frame 331 may include pre-USTE 338, USTE 340, and post-USTE 342. The USTE 340 may include a USFI 1100 that indicates that each STA1 304.1 through STA8 304.8 is to transmit a USF 1400 on a corresponding frequency 306. The post-USTE 342 may be a NDP. The method 300 continues at operation 358 with the STAs 304 transmitting a USF 312 to the AP 302. The USF 312 may be transmitted in accordance with the USTE 340. The USFs 312 may be based on a NDP the AP 302 transmits or one or more other packets transmitted by the AP 302, The AP 302 may use the channel quality (e.g, determined from the USREs 308) and the USFs 312 to determine channels to assign STAs 304 to for MU UL and/or MU DL transmission.

Figure 4:
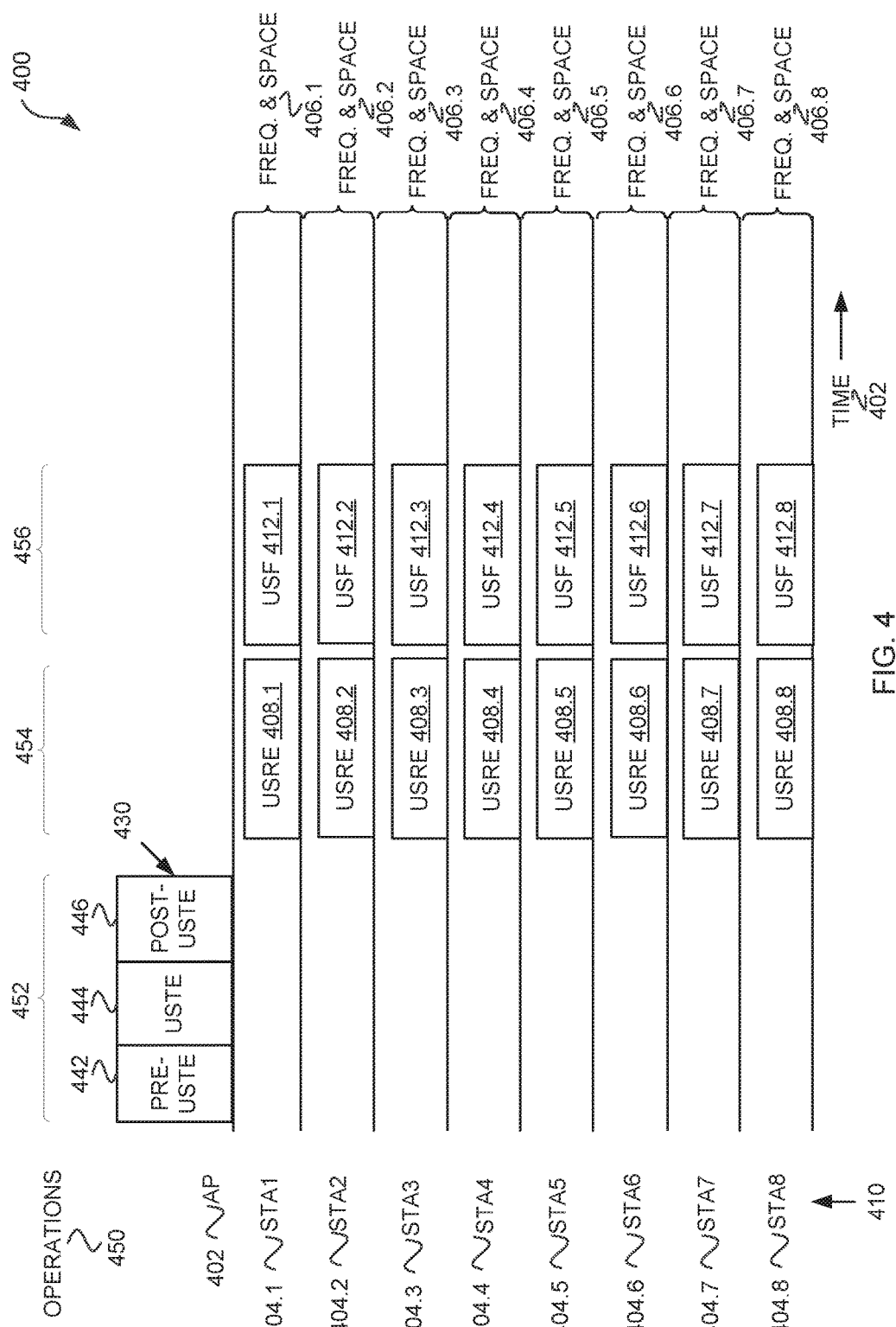
FIG. 4 illustrates a block diagram of a method for uplink sounding in accordance with some embodiments.

FIG. 4 illustrates a block diagram of a method 400 for uplink sounding in accordance with some embodiments. Illustrated in FIG. 4 is time 402 along a horizontal axis, frequency and space 406 along a vertical axis, transmitters 410, and operations 450.

The AP 402 may be a master station 104. The STAs 404 may be HE stations 104, The method 400 may begin with the AP 402 contending for the wireless medium (not illustrated). The method 400 continues at operation 452 with the AP 402 transmitting frame 430. Frame 430 may include a USTE 434, pre-USTE 432, and post-USTE 436. The USTE 434 may be a USTE 900, 1000, in accordance with some embodiments. The USTE 434 may be a frame in accordance with some embodiments. The USTE 434 may be a sounding IE, in accordance with some embodiments. The USTE 434 may be part of another IE or another dedicated frame in accordance with some embodiments. Pre-USTE 432 may be null data packet announcement (NDP-A) packet or another packet or portion of a packet. Post-USTE 436 may be a null data packet (NDP) or another packet or portion of a packet.

The USTE 434 may include a USREI that indicates that each STA1 404.1 through STA8 404.8 is to transmit a USRE 1300 on a corresponding frequency 406.

The USTE 430 may include a USFI 1100 that indicates that each STA1 404.1 through STA8 404.8 is to transmit a USF 1400 on a corresponding frequency 406.

The method 400 continues at operation 454 with the STAs 404 transmitting USREs 408. The STAs 404 transmit the USREs 408 in accordance with the USTE 434. In some embodiments, one or more of the STAs 404 may transmit the USREs 408 on two or more spatial streams. The USREs 434 may be, for example, long-training fields (UM). In some embodiments, the USRE 408 may be NDPs. The USREs 408 may be an embodiment of USREs 1300 as disclosed in conjunction with FIG. 13. The AP 302 receives the USREs 408 and may determine channel quality for the STAs 404.

The method 400 continues at operation 456 with the STAs 404 transmitting a USF 412 to the AP 402. The USF 412 may be transmitted in accordance with the USTE 430. The USFs 412 may be based on a NDP the AP 402 transmits or one or more other packets transmitted by the AP 402. The AP 402 may use the channel quality (e.g, determined from the USREs 408) and the USFs 412 to determine channels to assign STAs 404 to for MU UL and/or MU DL transmission.

Figure 5:
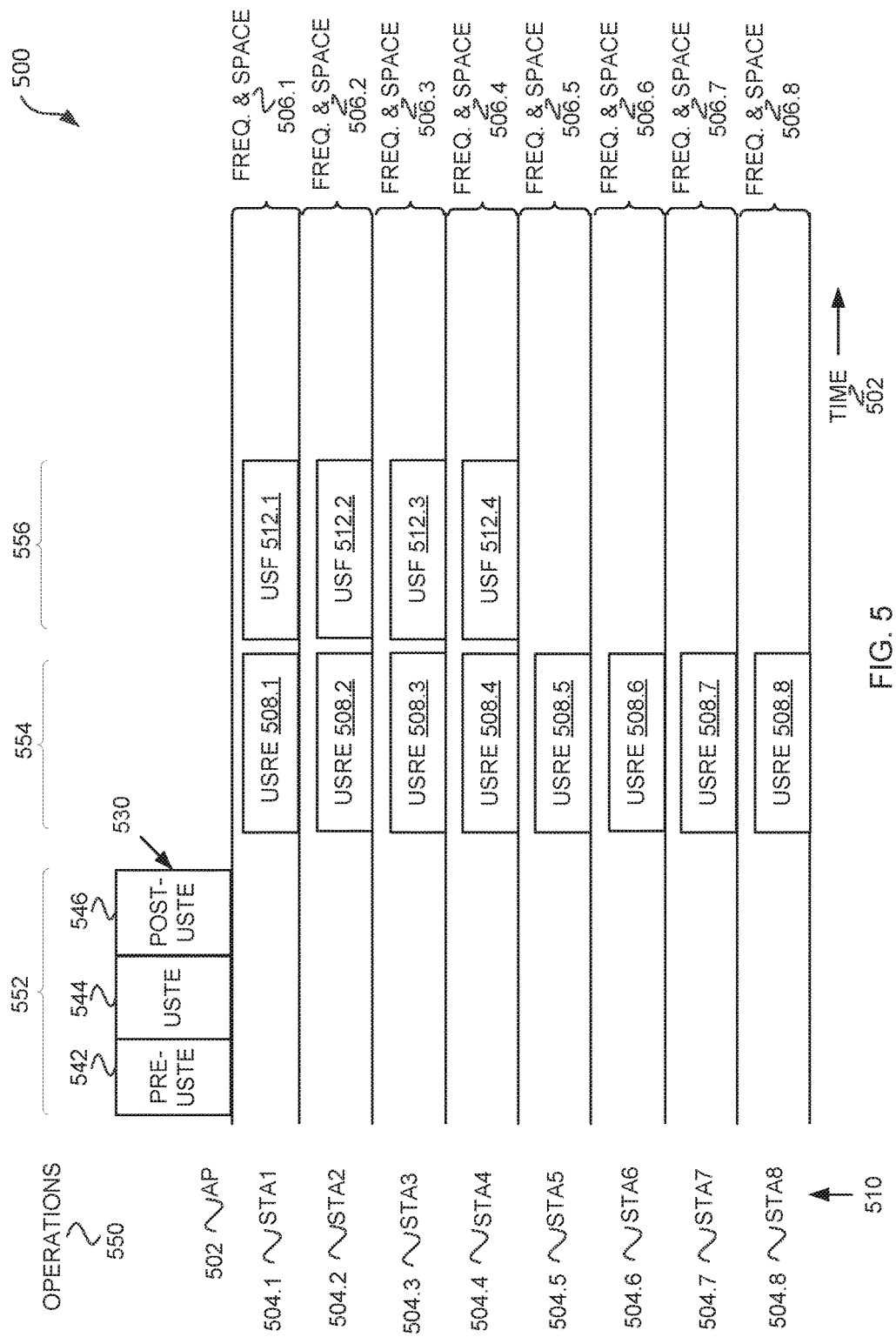
FIG. 5 illustrates a block diagram of a method for uplink sounding in accordance with some embodiments.

FIG. 5 illustrates a block diagram of a method 500 for uplink sounding in accordance with some embodiments. Illustrated in FIG. 5 is time 502 along a horizontal axis, frequency and space 506 along a vertical axis, transmitters 510, and operations 550.

The AP 502 may be a master station 102. The STAs 504 may be HE stations 104. The method 500 may begin with the AP 502 contending for the wireless medium (not illustrated). The method 500 continues at operation 552 with the AP 502 transmitting frame 530. Frame 530 may include a USTE 534, pre-USTE 532, and post-USTE 536. The USTE 534 may be a USTE 900, 1000, in accordance with some embodiments. The USTE 534 may be a frame in accordance with some embodiments. The USTE 534 may be a sounding IE, in accordance with some embodiments. The USTE 534 may be part of another IE or another dedicated frame in accordance with some embodiments. Pre-USTE 532 may be null data packet announcement (NDP-A) packet or another packet or portion of a packet. Post-USTE 536 may be a null data packet (NDP) or another packet or portion of a packet. The USTE 534 may include a USREI that indicates that each STA1 504.1 through STA8 504.8 is to transmit a USRE 1300 on a corresponding frequency 506.

The USTE 530 may include a USFI 1100 that indicates that each STA1 504.1 through STA8 504.4 is to transmit a USF 1400 on a corresponding frequency 506.

The method 500 continues at operation 554 with the STAs 504 transmitting USREs 508. The STAs 504 transmit the USREs 508 in accordance with the USTE 534, In some embodiments, one or more of the STAs 504 may transmit the USREs 508 on two or more spatial streams. The USREs 534 may be, for example, long-training fields (LTFs). In some embodiments, the USRE 508 may be NDPs. The USREs 508 may be an embodiment of USREs 1300 as disclosed in conjunction with FIG. 13. The AP 302 receives the USREs 508 and may determine channel quality for the STAs 504.

The method 500 continues at operation 556 with the STA 504.1 through STA 504.4 transmitting USF 512.1 through USF 512.4, respectively, to the AP 502. The USFs 512 may be transmitted in accordance with the USTE 530 (e.g., a USFI 1100). The USFs 512 may be based on a NDP the AP 502. transmits or one or more other packets transmitted by the AP 502. The AP 502 may use the channel quality (e.g, determined from the USREs 508) and the USFs 512 to determine channels to assign STAs 504 to for MU UL and/or MU DL transmission.

Figure 6:
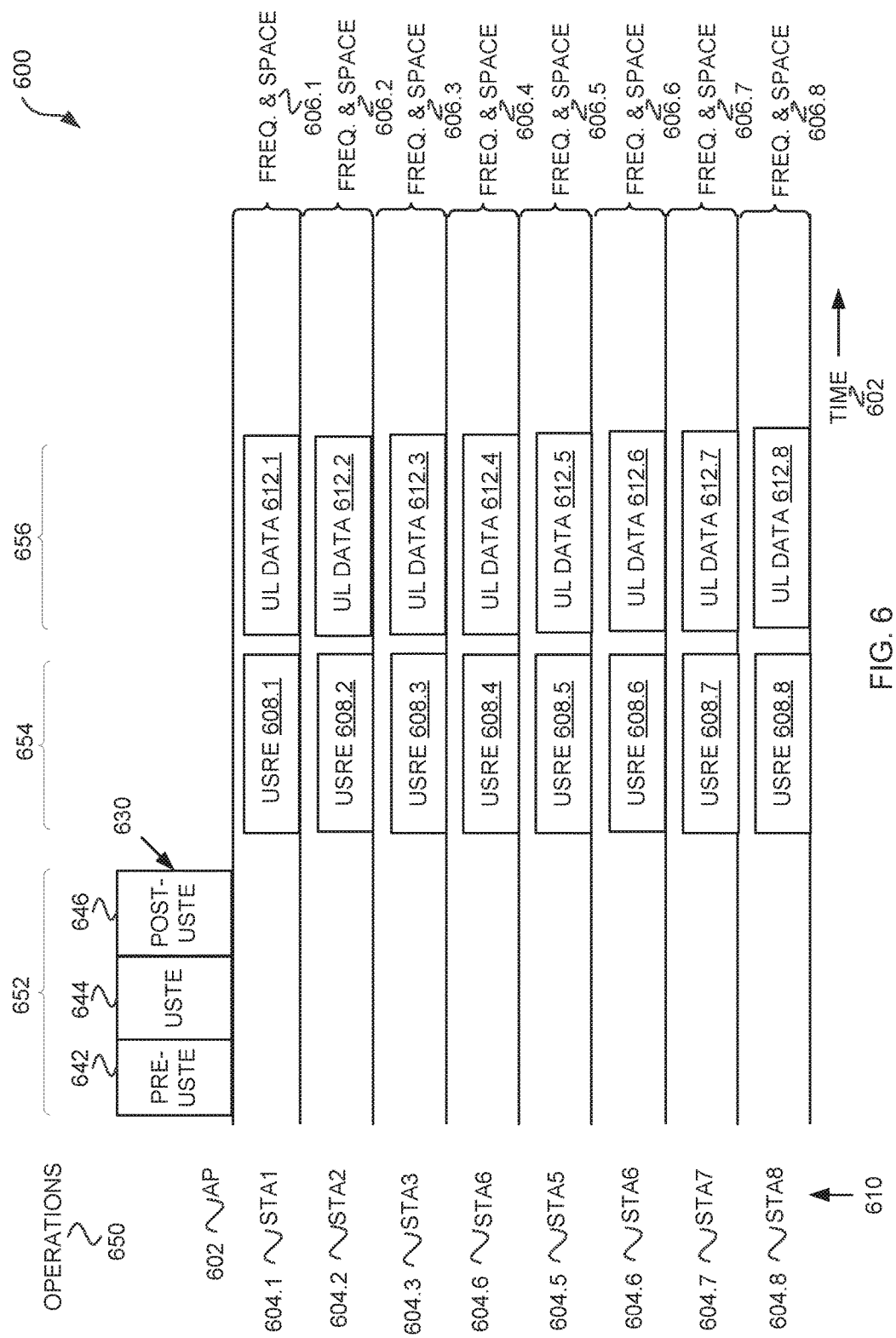
FIG. 6 illustrates a block diagram of a method for uplink sounding in accordance with some embodiments.

FIG. 6 illustrates a block diagram of a method 600 for uplink sounding in accordance with some embodiments. Illustrated in FIG. 6 is time 602 along a horizontal axis, frequency and space 606 along a vertical axis, transmitters 610, and operations 650.

The AP 602 may be a master station 102. The STAs 604 may be HE stations 104. The method 600 may begin with the AP 602 contending for the wireless medium (not illustrated). The method 600 continues at operation 652 with the AP 602 transmitting frame 630. Frame 630 may include a USTE 634, pre-USTE 632, and post-USTE 636. The USTE 634 may be a USTE 900, 1000, in accordance with some embodiments. The USTE 634 may be a frame in accordance with some embodiments. The USTE 634 may be a sounding IE, in accordance with some embodiments. The USTE 634 may be part of another IE or another dedicated frame in accordance with some embodiments. Pre-USTE 632 may be null data packet announcement (NDP-A) packet or another packet or portion of a packet. Post-USTE 636 may be a null data packet (NDP) or another packet or portion of a packet. The USTE 634 may include a USREI that indicates that each STA1 604.1 through STA8 604.8 is to transmit a USRE 1300 on a corresponding frequency 606.

The USTE 630 may include a MU UL data resource allocation for each of the STAs 604.

The method 600 continues at operation 654 with the STAs 604 transmitting USREs 608. The STAs 604 transmit the USREs 608 in accordance with the USTE 634. In some embodiments, one or more of the STAs 604 may transmit the USREs 608 on two or more spatial streams. The USREs 634 may be, for example, long-training fields (LTFs). In some embodiments, the USRE 608 may be NDPs. The USREs 608 may be an embodiment of USREs 1300 as disclosed in conjunction with FIG. 13. The AP 302 receives the USREs 608 and may determine channel quality for the STAs 604.

The method 600 continues at operation 656 with the STAs 604 transmitting UL data 612 to the AP 602, The UL data 612 may be transmitted in accordance with the USTE 630, The AP 602 may use the channel quality (e.g. determined from the USREs 608) to determine channels to assign STAs 604 to for MU UL and/or MU DL transmission.

Figure 7:
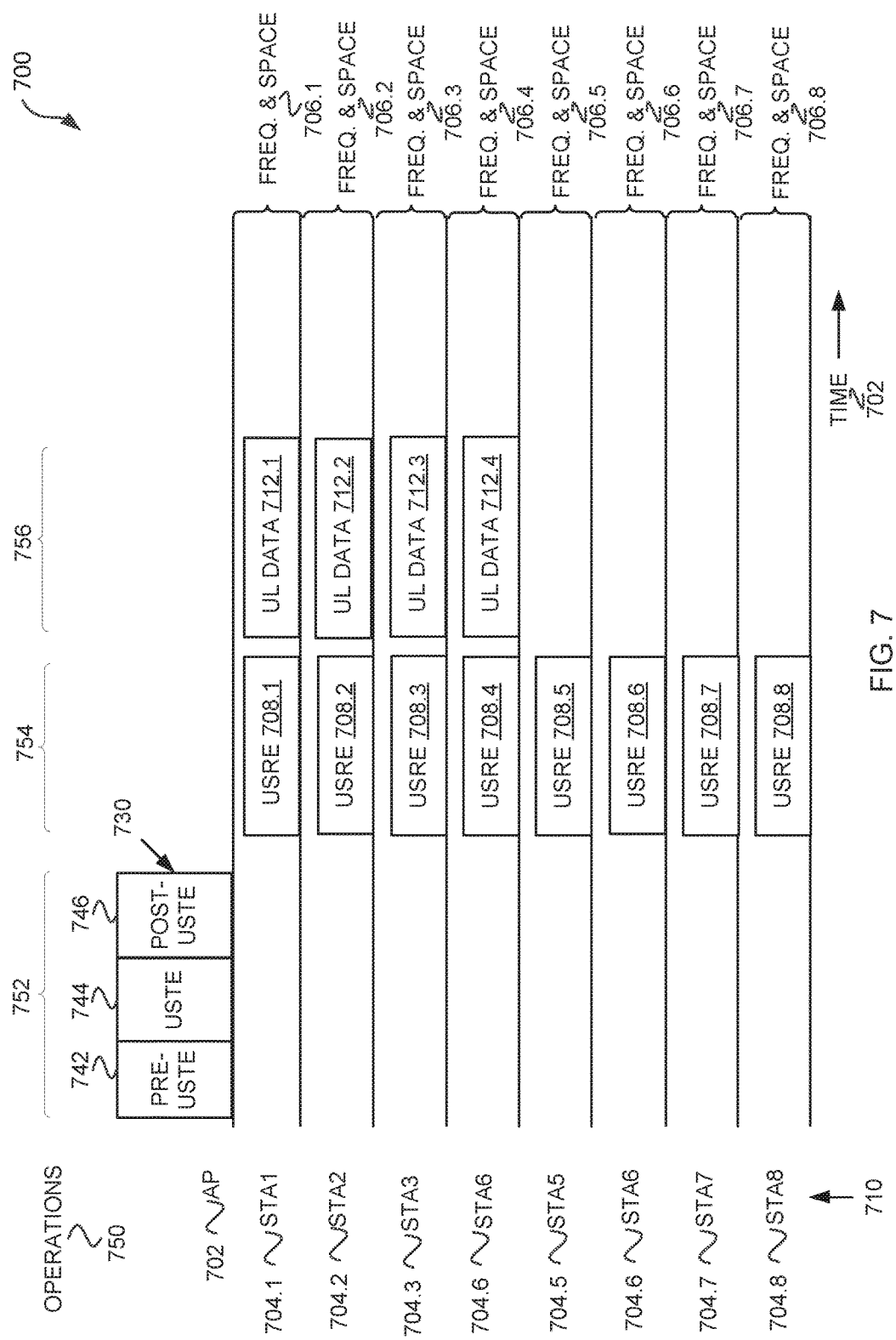
FIG. 7 illustrates a block diagram of a method for uplink sounding in accordance with some embodiments.

FIG. 7 illustrates a block diagram of a method 700 for uplink sounding in accordance with some embodiments. Illustrated in FIG. 7 is time 702 along a horizontal axis, frequency and space 706 along a vertical axis, transmitters 710, and operations 750.

The AP 702 may be a master station 102. The STAs 704 may be HE stations 104. The method 700 may begin with the AP 702 contending for the wireless medium (not illustrated). The method 700 continues at operation 752 with the AP 702 transmitting frame 730. Frame 730 may include a USTE 734, pre-USTE 732, and post-USTE 736. The USTE 734 may be a USTE 900, 1000, in accordance with some embodiments. The USTE 734 may be a frame in accordance with some embodiments, The USTE 734 may be a sounding IE, in accordance with some embodiments. The USTE 734 may be part of another IE or another dedicated frame in accordance with some embodiments. Pre-USTE 732 may be null data packet announcement (NDP-A) packet or another packet or portion of a packet. Post-USTE 736 may be a null data packet (NDP) or another packet or portion of a packet. The USTE 734 may include a USREI that indicates that each STA1 704.1 through STA8 704.8 is to transmit a USRE 1300 on a corresponding frequency 706.

The USTE 730 may include a MU UL data resource allocation for STA1 704.1 through STA4 704.4.

The method 700 continues at operation 754 with the STAs 704 transmitting USREs 708. The STAs 704 transmit the USREs 708 in accordance with the USTE 734. In sonic embodiments, one or more of the STAs 704 may transmit the USREs 708 on two or more spatial streams. The USREs 734 may be, for example, long-training fields (LTFs). In some embodiments, the USRE 708 may be NDPs. The USREs 708 may be an embodiment of USREs 1300 as disclosed in conjunction with FIG. 13. The AP 302. receives the USREs 708 and may determine channel quality for the STAs 704.

The method 700 continues at operation 756 with STA1 704.1 through STA4 704.4 transmitting UL data 712.1 through UL data 712.4, respectively, to the AP 702. The UL data 712 may be transmitted in accordance with the USTE 730. The AP 702 may use the channel quality (e.g. determined from the USREs 708) to determine channels to assign STAs 704 to for MU UL and/or DL transmission.

Figure 8:
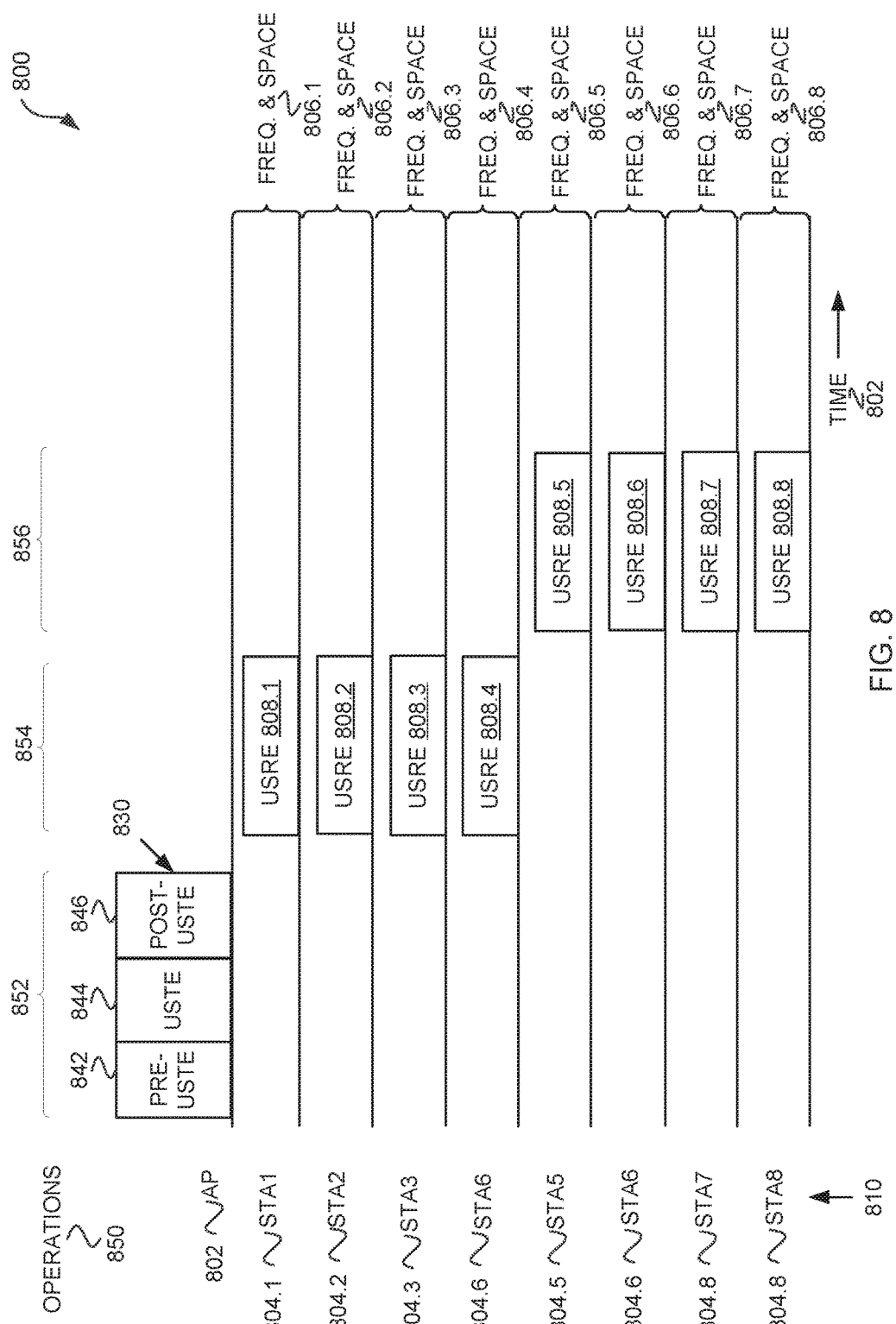
FIG. 8 illustrates a block diagram of a method for uplink sounding in accordance with some embodiments.

FIG. 8 illustrates a block diagram of a method 800 for uplink sounding in accordance with some embodiments. Illustrated in FIG. 8 is time 802 along a horizontal axis, frequency and space 806 along a vertical axis, transmitters 810, and operations 850.

The AP 802 may be a master station 104. The STAs 804 may be HE stations 104. The method 800 may begin with the AP 802 contending for the wireless medium (not illustrated). The method 800 continues at operation 852 with the AP 802 transmitting frame 830. Frame 830 may include a USTE 834, pre-USTE 832, and post-USTE 836. The USTE 834 may be a USTE 900, 1000, in accordance with some embodiments. The USTE 834 may be a frame in accordance with some embodiments. The USTE 834 may be a sounding information element (IE), in accordance with some embodiments. The USTE 834 may be part of another IE or another dedicated frame in accordance with some embodiments. Pre-USTE 832 may be null data packet announcement (NDP-A) packet or another packet or portion of a packet. Post-USTE 836 may be a null data packet (NDP) or another packet or portion of a packet. The USTE 834 may include a USREI that indicates that each STAT 804.1 through STA8 804.8 is to transmit a USRE 1300 on a corresponding frequency 806 at a particular time. In some embodiments, there are two USREI one for STA1 804.1 through STA4 804.4, and one for STA5 804.5 through STA.8 804.8.

The method 800 continues at operation 854 with STAs 804 transmitting USREs 808. STA1 804.1 through STA4 804.4 transmitting USREs 808.1 through USRE 808.4 in accordance with the USTE 834. The method 800 continues at operation 856 with STAs 804 transmitting USREs 808. STA1 804.5 through STA4 804.8 transmitting USREs 808.5 through USRE 808.8 in accordance with the USTE 834.

In some embodiments, one or more of the STAs 804 may transmit the USREs 808 on two or more spatial streams. The USRE 808 may be, for example, long-training fields (LTFs). In some embodiments, the USRE 808 may be NDPs. The USREs 808 may be an embodiment of USREs 1300 as disclosed in conjunction with FIG. 13.

The AP 802 receives the USREs 808 and may determine channel quality for the STAs 804. The AP 802 may use the channel quality to determine channels to assign STAs 804 to for MU UL and/or MU DL transmission.

Figure 9:
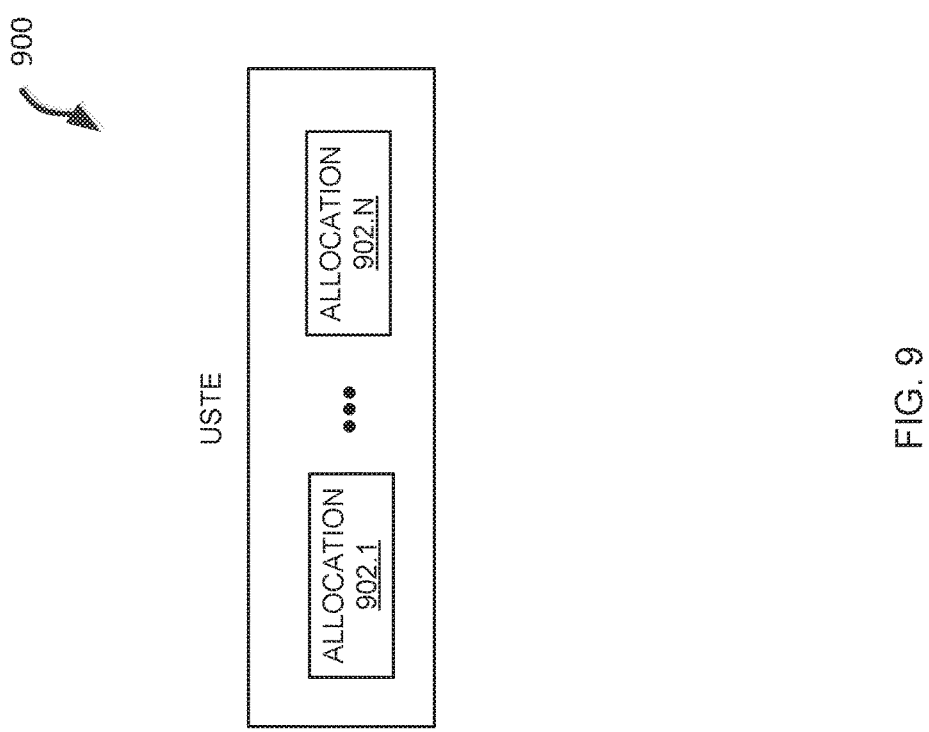
FIG. 9 illustrates an uplink sounding trigger element (USTE) in accordance with some embodiments.

FIG. 9 illustrates an uplink sounding trigger element (USTE) 900 in accordance with some embodiments. The USTE 900 may be a frame in accordance with some embodiments. The USTE 900 may be a sounding information element (IE), in accordance with some embodiments. The USTE 900 may be part of another IE or another dedicated frame in accordance with some embodiments.

The USTE 900 may include one or more allocations 902. For example, USTE 900 may include allocation 902.1 through allocation 902.n. The allocation 902 may be a USTE 1000, a USF format 1100, a USRE format 1200, or another allocation 902 such as a MU UL data allocation (not illustrated).

The USTE 900 may indicate to one or more HE stations 104 and/or one or more groups of HE stations 104 one or more of the following: type, allocation, and format of USRE to be sent by the HE station 104 (e.g., USRE format 1200), type, allocation, and format of USF (e.g., USF 1100) to be sent by the HE station 104 (e.g., USF 1100), and a MU UL data allocation.

Figure 10:
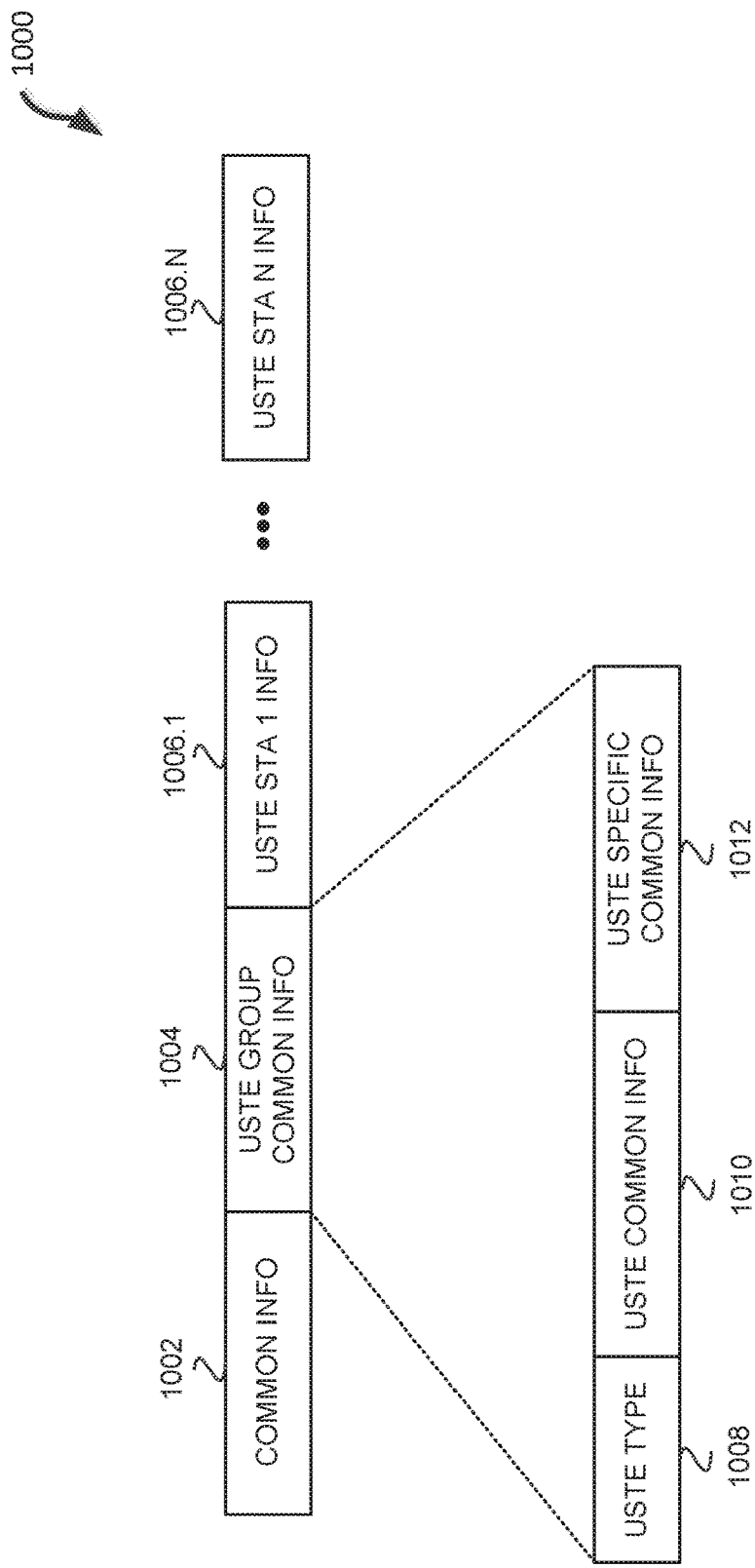
FIG. 10 illustrates an uplink sounding trigger element (USTE) in accordance with some embodiments.

FIG. 10 illustrates an uplink sounding trigger element (USTE) 1000 in accordance with some embodiments. The USTE 1000 may comprise common information (info) 1002, USTE group common info 1004, USTE sta 1 info 1006.1 through USTE sta N info 1006.n. The USTE 1000 may be a frame in accordance with some embodiments, The USTE 1000 may be a sounding information element (IE), in accordance with some embodiments. The USTE 1000 may be part of another IE or another dedicated frame in accordance with some embodiments.

The USTE 1000 may indicate to one or more HE stations 104 and/or one or more groups of HE stations 104 one or more of the following: type, allocation, and format (e.g., USREI 1200) of USRE (e.g., USRE 1300) to be sent by the HE station 104; type, allocation, and format (e.g., USFI 1100) of USF (e.g., USFI 1400) to be sent by the HE station 104; and, a MU UL data allocation.

The common information 1002, USTE group common information 1004, USTE type 1008, USTE common information 1010, USTE specific common information 1012, and USTE sta information 1006 each may include one or more of the following type of feedback to provide, e.g. signal to noise ratio, signal strength, energy detect value, a feedback matrix (e.g., the V matrix) that enables the beamformer to calculate a steering matrix, channel state information (CSI), etc.; type of allocation, e.g. USRE 1300 or USFI 1400; format, e.g., LTF or NDP for USRE 1300; allocation to transmit on, e.g., RU, frequency and bandwidth, one or more spatial streams, and a duration; sounding duration; air resources (e.g., to encode and transmit the packet or LTF), e.g., MCS, coding type (e.g, low-density parity check or convolutional coding), and dual carrier modulation (DCM); and, sounding related PRY level transmission parameters for USRE 1200.

Figure 11:
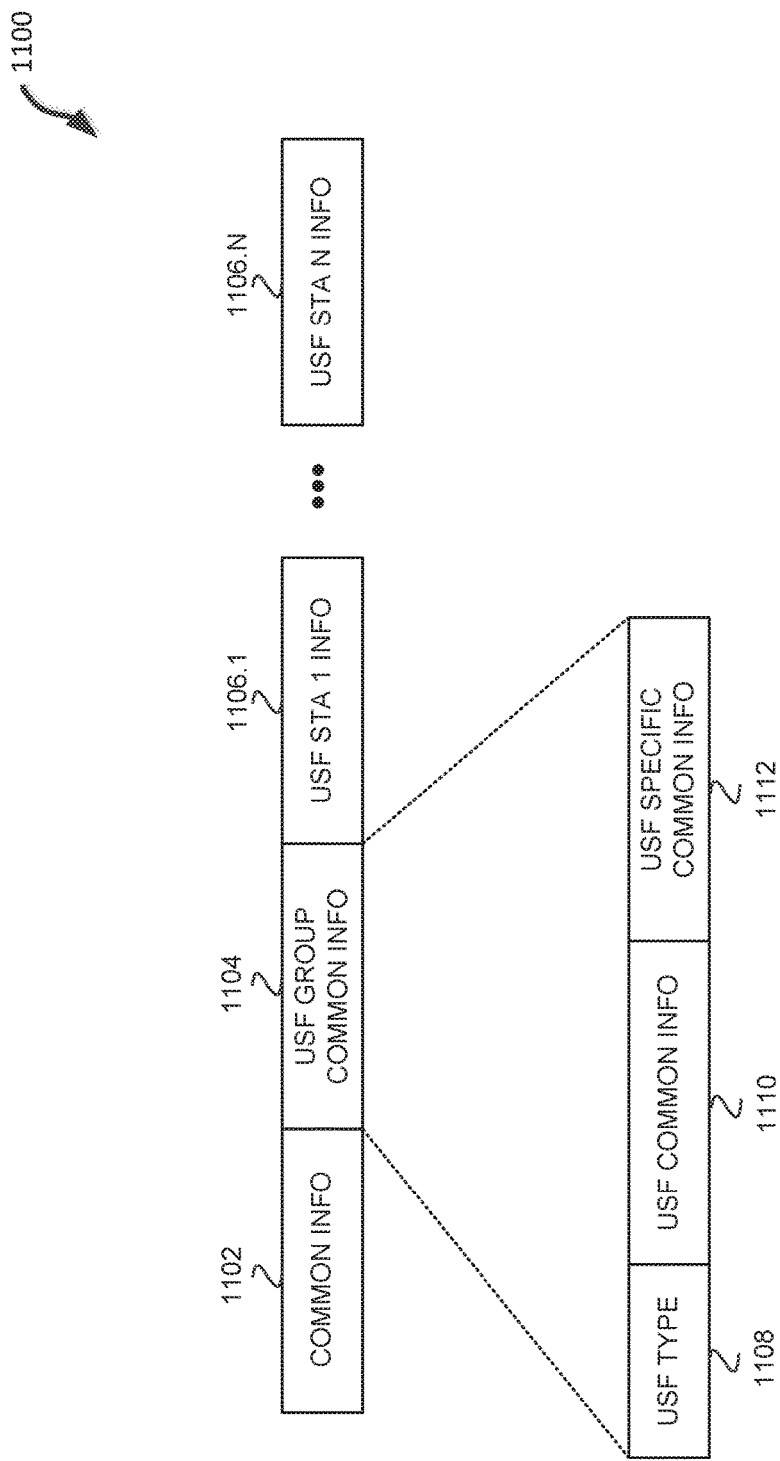
FIG. 11 illustrates an uplink sounding feedback information element (USFI) in accordance with some embodiments.

FIG. 11 illustrates an uplink sounding feedback 1100 information element (USFI) in accordance with some embodiments. The USFI 1100 may comprise common info 1102, USF group common info 1104, USF sta 1 info 1106.1 through UST sta N info 1106.n. The USF group common information 1104 may include a USF type 1108, USF common information 1110, and a USF specific common information 1112.

The USFI 1100 may be a frame in accordance with some embodiments. The USFI 1100 may be a sounding information element (IE), in accordance with some embodiments. The USFI 1100 may be part of another IE or another dedicated frame in accordance with some embodiments.

The common information 1102, UST group common information 1104, USF type 1108, USF common information 1110, USF specific common information 1112, and USF sta information 1106 each may include one or more of the following type of feedback to provide, e.g. signal to noise ratio, signal strength, energy detect value, a feedback matrix (e.g., the V matrix) that enables the beamformer to calculate a steering matrix, channel state information (CSI), etc.; type of allocation, e.g. USRE 1300 or USFI 1400; format, e.g., LTF or NDP for USRE 1300; allocation to transmit on, e.g., RU, frequency and bandwidth, one or more spatial streams, and a duration; sounding duration; air resources (e.g., to encode and transmit the packet or LTF), e.g., MCS, coding type (e.g, low-density parity check or convolutional coding), and dual carrier modulation (DCM); and, sounding related PHY level transmission parameters for USRE 1200.

Figure 12:
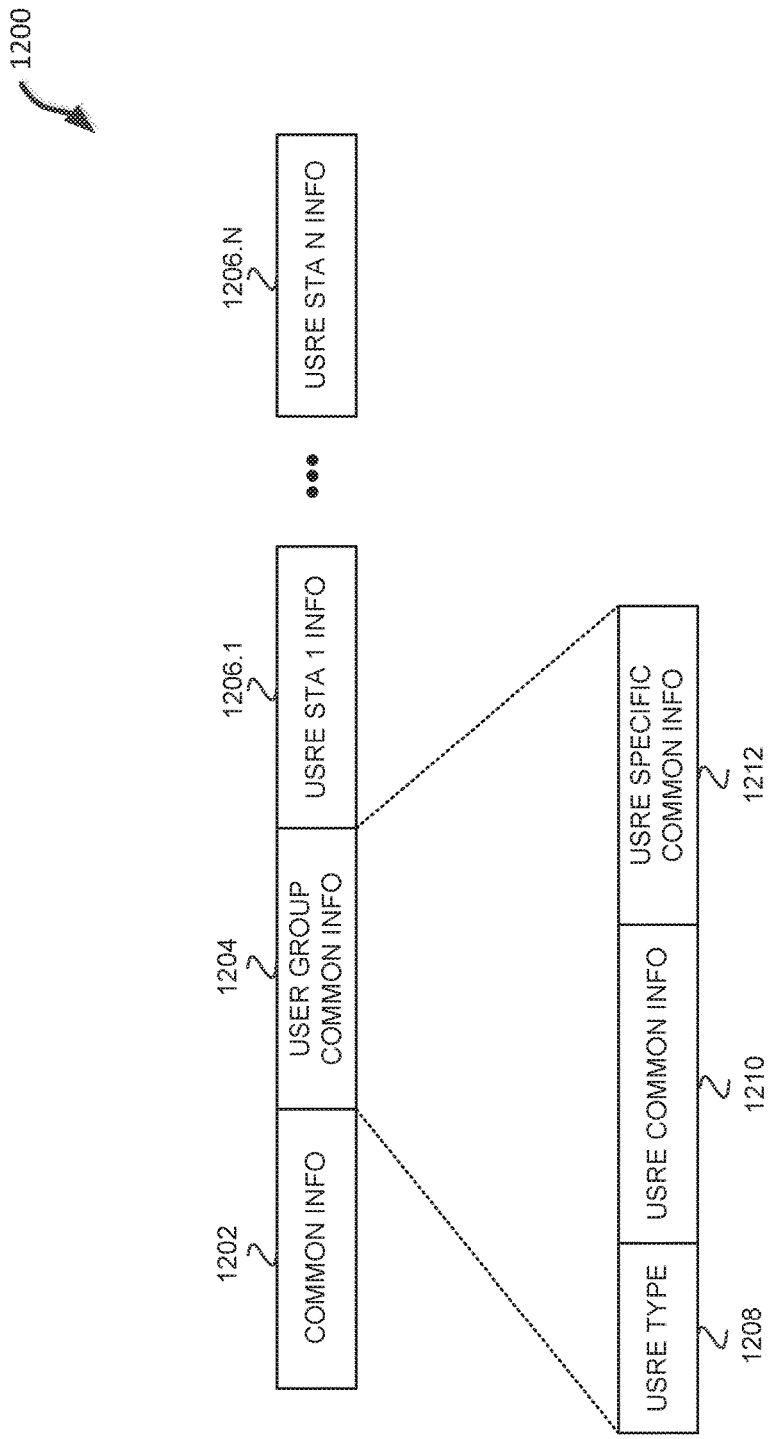
FIG. 12 illustrates an uplink sounding referee elements information element (USREI) in accordance with some embodiments.

FIG. 12 illustrates an uplink sounding referee elements information element (USREI) 1200 in accordance with some embodiments. The USREI 1200 may comprise common info 1202, USRE group common info 1204, USRE sta 1 info 1206.1 through USF sta N info 1206.n. The USRE group common information 1204 may include a USRE type 1208, USRE common information 1210, and a USRE specific common information 1212.

The USREI 1200 may be a frame in accordance with some embodiments. The USREI 1200 may be a sounding IE, in accordance with some embodiments. The USREI 1200 may be part of another IE or another dedicated frame in accordance with some embodiments.

The common information 1202, USRE group common information 1204, USRE type 1208, USRE common information 1210, USRE specific common information 1212, and USRE sta information 1206 each may include one or more of the following type of feedback to provide, e.g. signal to noise ratio, signal strength, energy detect value, fading, receive power, interference, a feedback matrix (e.g., the V matrix) that enables the beamformer to calculate a steering matrix, channel state information (CSI), etc.; type of allocation, e.g. USRE 1300 or USFI 1400; format, e.g., LTF or NDP for USRE 1300; allocation to transmit on, e.g., RU, frequency and bandwidth, one or more spatial streams, and a duration; sounding duration; air resources (e.g., to encode and transmit the packet or LTF), e.g., MCS, coding type (e.g, low-density parity check or convolutional coding), and dual carrier modulation (DCM); and, sounding related PHY level transmission parameters for USRE 1200.

Figure 13:
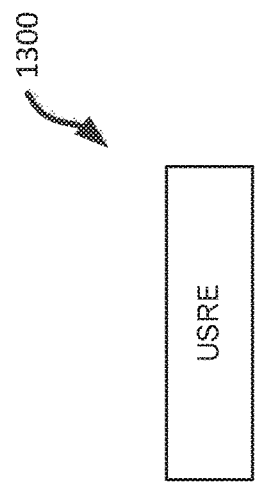
FIG. 13 illustrates a block diagram of an uplink sounding referee element (USRE) in accordance with some embodiments.

FIG. 13 illustrates a block diagram of an uplink sounding referee element (USRE) 1300 in accordance with some embodiments. The USRE 1300 may be a LTF. The USRE 1300 may be configured in accordance with one or more of USTE 900, USTE 1000, and USREI 1200. The USRE 1300 may provide training in response to a USTE 900, The USRE 1300 may be a portion of another packet or a packet.

Figure 14:
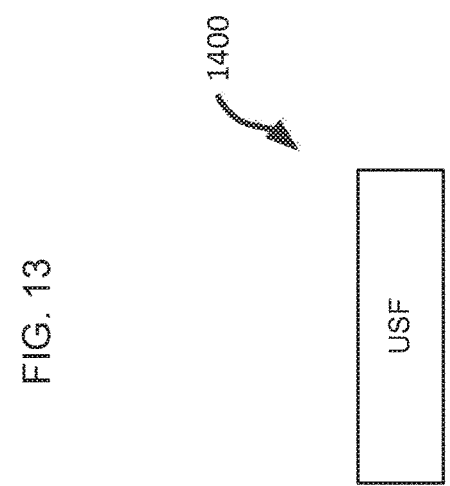
FIG. 14 illustrates a block diagram of an UL sounding feedback (USF) in accordance with some embodiments.

FIG. 14 illustrates a block diagram of an UL sounding feedback (USF) 1400 in accordance with some embodiments. The USF 1400 may be configured in accordance with one or more of USTE 900, USTE 1000, and USFI 1100. The USF 1400 may provide feedback in response to USTE 900. The USF 1400 may a portion of another packet or a packet.

Figure 15:
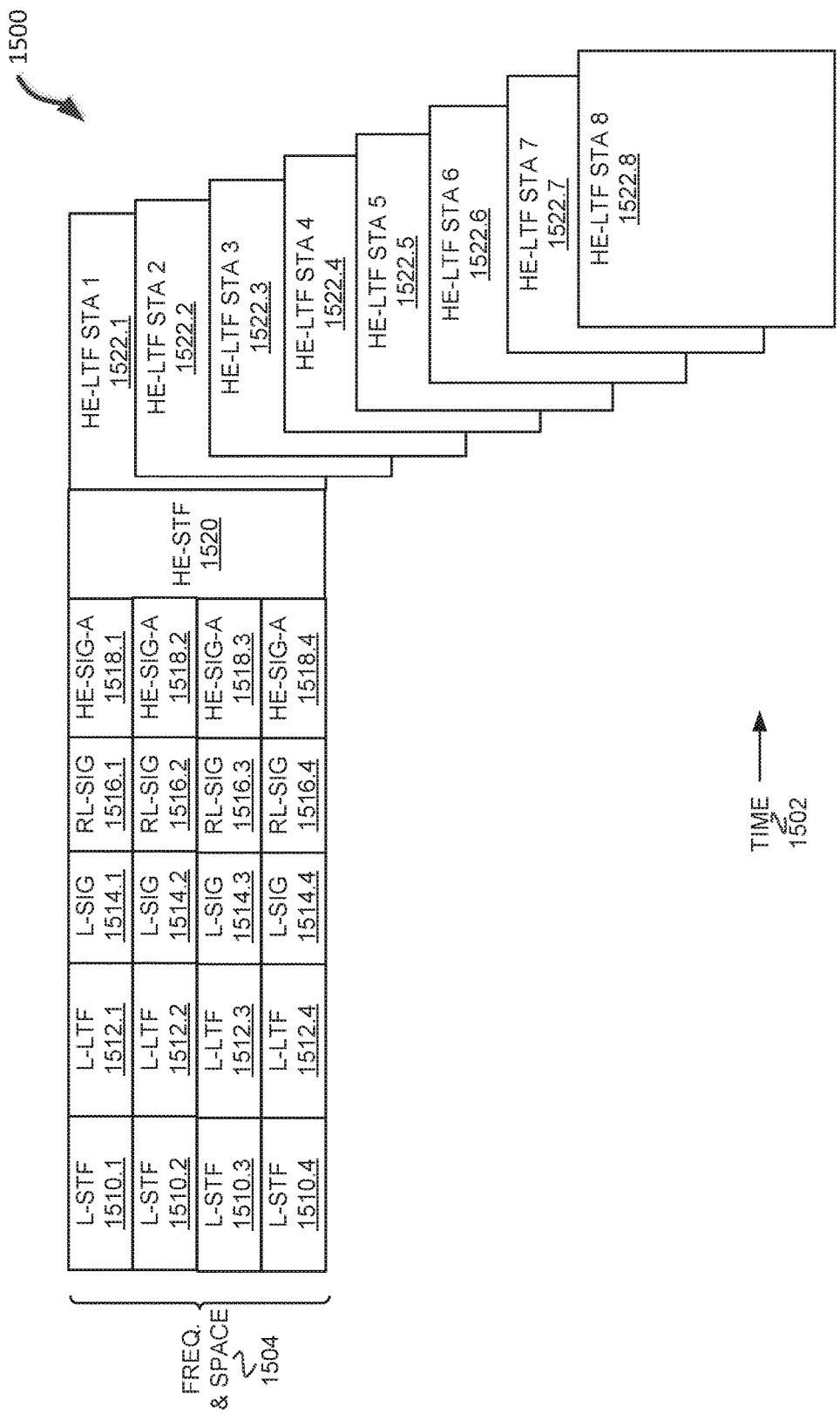
FIG. 15 illustrates a block diagram of a method for uplink sounding in accordance with some embodiments.

FIG. 15 illustrates a block diagram of a method 1500 for uplink sounding in accordance with some embodiments. Illustrated in FIG. 15 is time 1502 along a horizontal axis and frequency and space 1504 along a vertical axis. Illustrated in FIG. 15 are L-STF 1510, L-LTF 1512, L-SIG 1514, RL-SIG 1516, HE-SIG-A 1518, HE-STF 1520, and HE-LTF STA1 1522.1 through HE-LTF STA8 1522.8. The USRE 1300 may be a HE-LTF that are to be transmitted on an 80 MHz channel with the STAs transmitting the USRE after the previous STA is finished transmitting their USRE (e.g., HE-LTF). Each STA may be allocated a single USRE and allocated a time domain.

Figure 16:
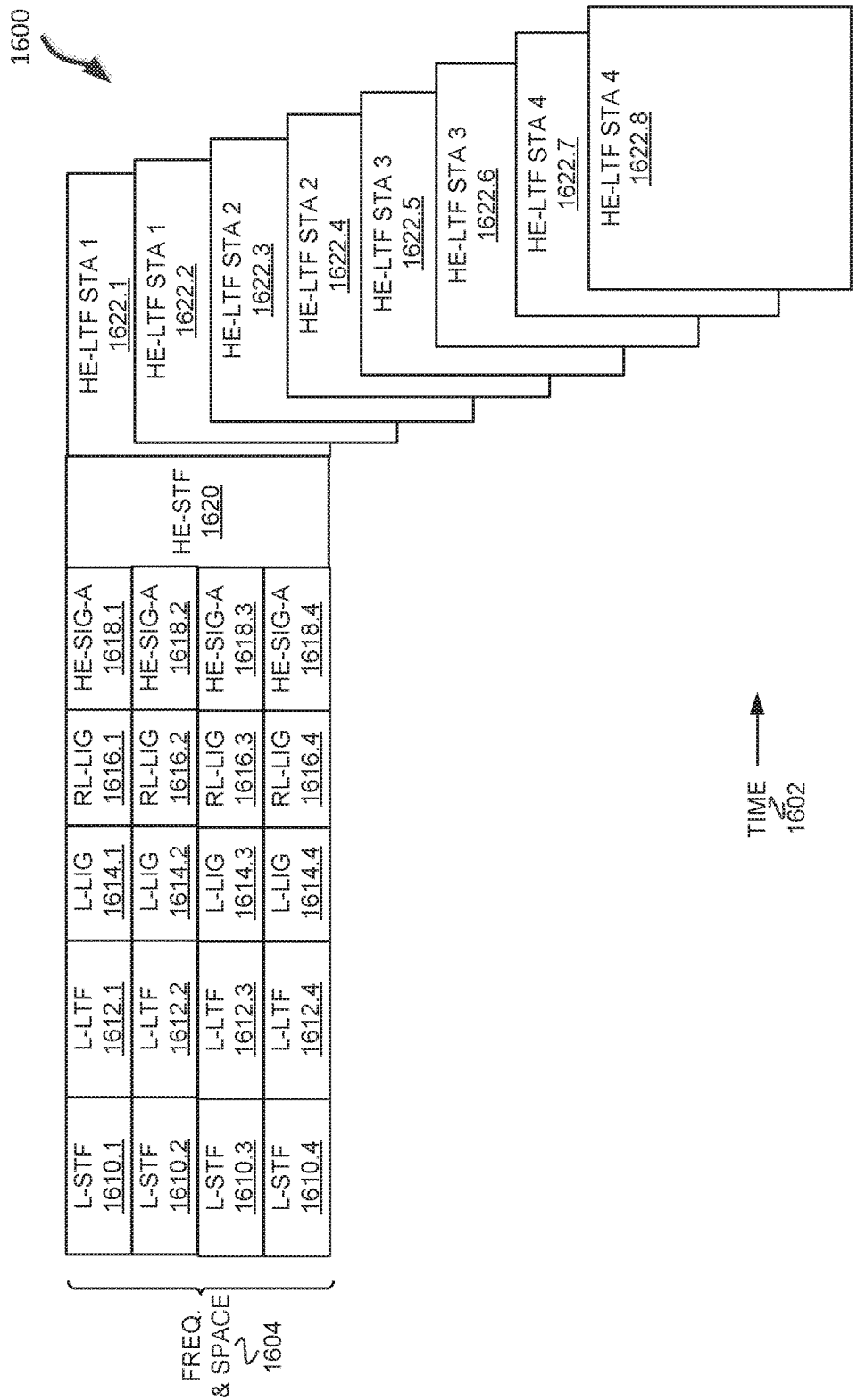
FIG. 16 illustrates a block diagram of a method for uplink sounding in accordance with some embodiments.

FIG. 16 illustrates a block diagram of a method 1600 for uplink sounding in accordance with some embodiments. Illustrated in FIG. 16 is time 1602 along a horizontal axis and frequency and space 1604 along a vertical axis. Illustrated in FIG. 16 are L-STF 1610, L-LTF 1612, L-SIG 1614, RL-SIG 1616, HE-SIG-A 1618, HE-STF 1620, and HE-LTF STA1 1622.1 through HE-LTF STA8 1622.8. The USRE 1300 may be a HE-LTF that are to be transmitted on an 80 MHz channel with the STAs transmitting the USRE after the previous STA is finished transmitting their USRE (e.g., HE-LTF). Each STA may be allocated two USRE and allocated a time domain.

Figure 17:
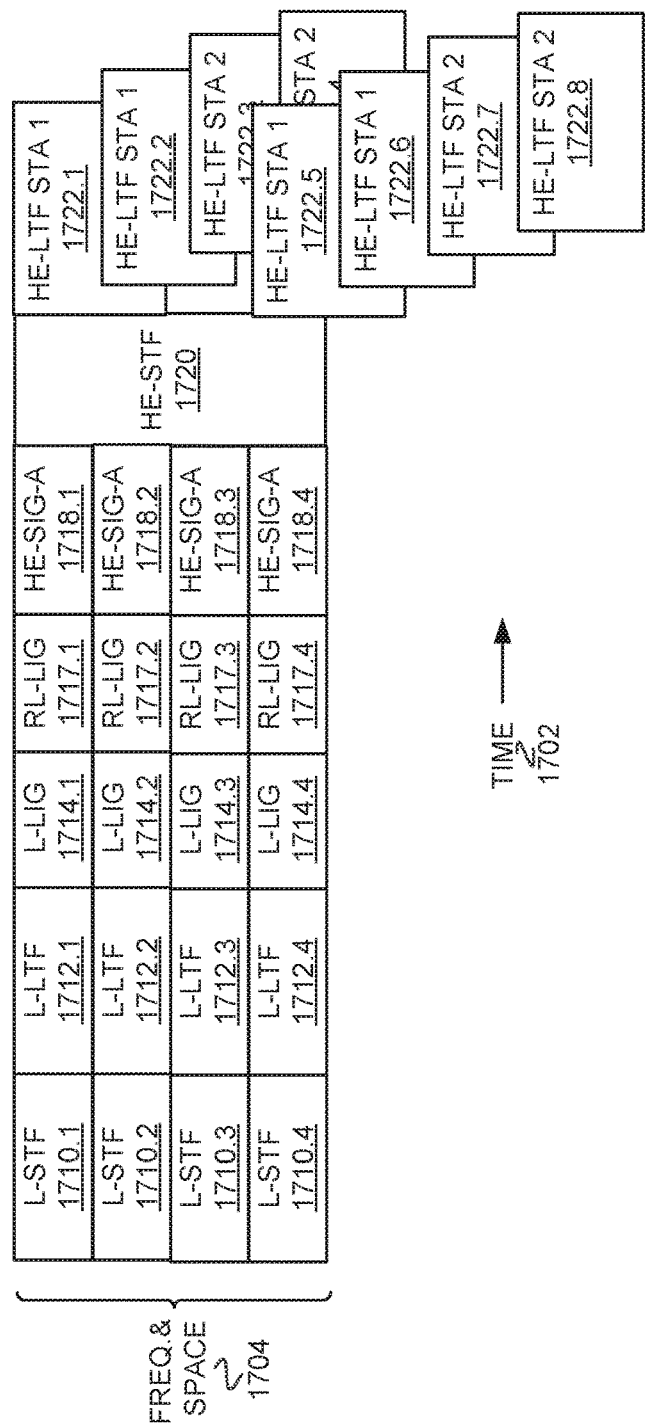
FIG. 17 illustrates a block diagram of a method for uplink sounding in accordance with some embodiments.

FIG. 17 illustrates a block diagram of a method 1700 for uplink sounding in accordance with some embodiments. Illustrated in FIG. 17 is time 1702 along a horizontal axis and frequency and space 1704 along a vertical axis. Illustrated in FIG. 17 are L-STF 1710, L-LTF 1712, L-SIG-1714, RL-SIG 1716, HE-SIG-A 1718, HE-STF 1720, and HE-LTF STA1 1722.1 through HE-LTF STA8 1722.8. The USRE 1300 may be a HE-LTF that are to be transmitted on an 40 MHz channel or 20 MHz channel with the STAs transmitting the USRE after the previous STA is finished transmitting their USRE (e.g., HE-LTF). Each STA may be allocated four USRE and allocated a time domain and frequency domain. HE-LTF STA 1 1722.1 and HE-LTF STA 1 1722.5 may be transmitted on different channels. The next HE-LTF STA 1722 on the same channel may wait until the previous HE-LTF STA 1722 transmission is finished. For example, HE-LT F STA 2 1722.7 may wait until HE-LTF STA 1 1722.6 is finished being transmitted, and HE-LTF STA 1 1722.1 and HE-LTF STA 1 1722.5 may be transmitted simultaneously.

Figure 18:
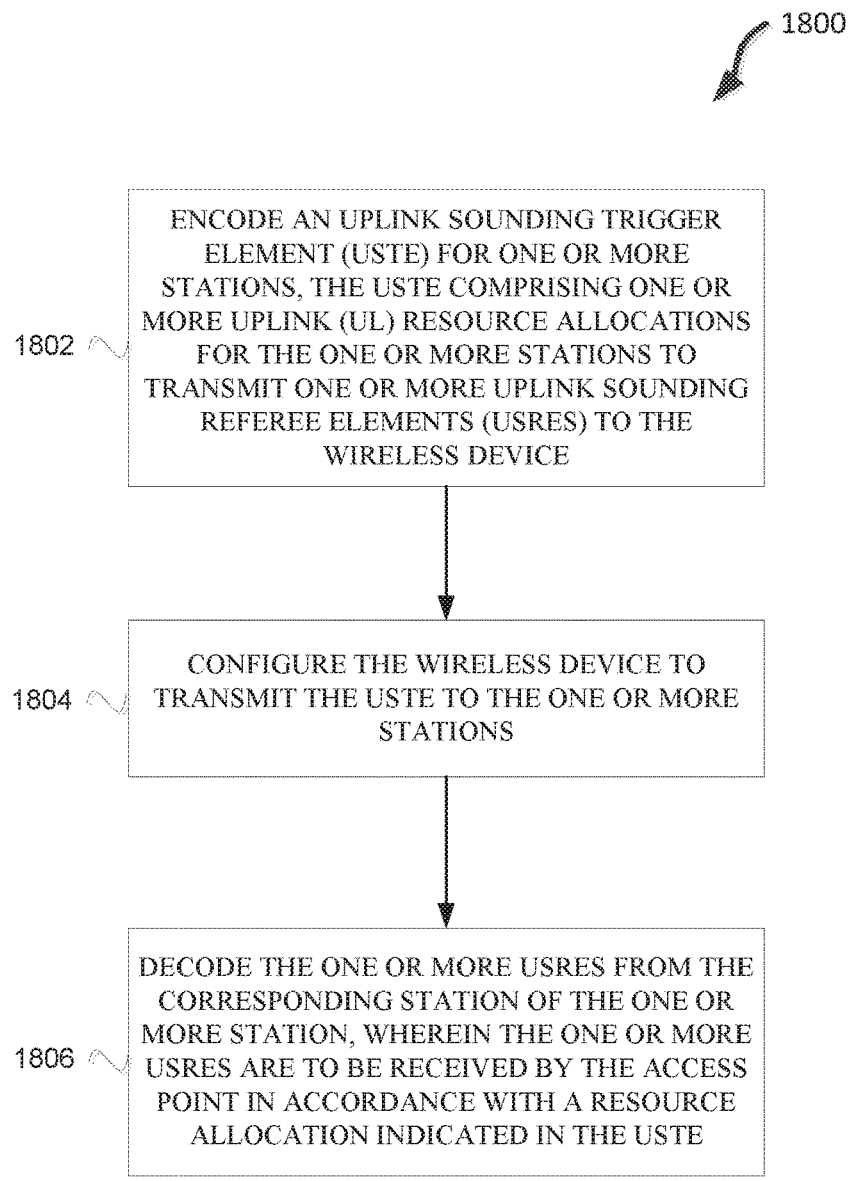
FIG. 18 illustrates a block diagram of a method for uplink sounding in accordance with some embodiments.

FIG. 18 illustrates a block diagram of a method 1800 for uplink sounding in accordance with some embodiments. The method 1800 may begin at operation 1802 with encoding an uplink sounding trigger element (USTE) for one or more stations, the USTE including one or more uplink (UL) resource allocations for the one or more stations to transmit one or more uplink sounding referee elements (USREs) to the wireless device. For example, AP 202 may encode USTE 234 with a USREI 1200 that indicates a format for the USRE 208. The USTE 234 may include a resource allocation for the STAs 204 to transmit the USRE 208. Moreover, APs 302, 402, 502, 602, 702, and 802, may encode a USTE as disclosed in conjunction with FIGS. 3-8. Moreover, a USTE may encoded for the USREs disclosed in conjunction with FIGS. 15-18.

The method 1800 may continue at operation 1804 with configuring the wireless device to transmit the USTE to the one or more stations. For example, an apparatus of AP 202, 302, 402, 502, 602, 702, and 802 may configure the APs 202, 302, 402, 502, 602, 702, and 802 to transmit the USTE.

The method 1800 may continue at operation 1806 with decoding the one or more USREs from the corresponding station of the one or more station, wherein the one or more USREs are to be received by the access point in accordance with a resource allocation indicated in the USTE. For example, USREs 208 are received from STAs 204 in accordance with the USTE 234. Moreover, USREs may be received in accordance with USTEs transmitted by an access point as disclosed in conjunction with FIGS. 3-8 and FIGS. 15-18.

Figure 19:
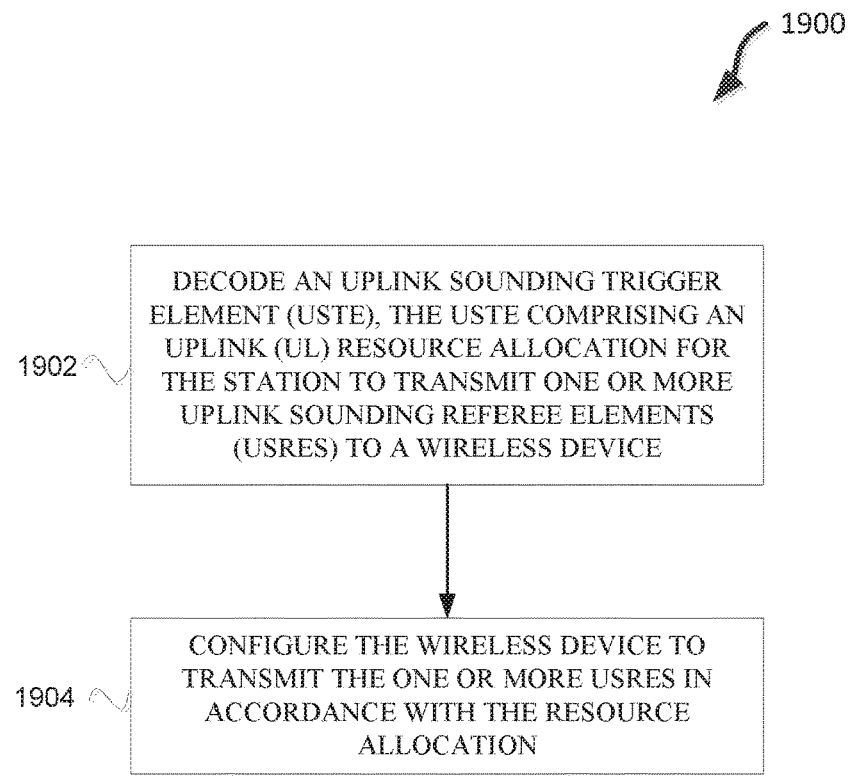
FIG. 19 illustrates a block diagram of a method for uplink sounding in accordance with some embodiments.

FIG. 19 illustrates a block diagram of a method 1900 for uplink sounding in accordance with some embodiments. The method 1900 may begin with at operation 1902 with decoding an uplink sounding trigger element (USTE), the USTE comprising an uplink (UL) resource allocation for the station to transmit one or more uplink sounding referee elements (USREs) to a wireless device. For example, STAs 204 may decode USTE 234. Moreover, STAs 304, 404, 504, 604, 704, 804, and STAs of FIGS. 15-18 may decode a USTE.

The method 1900 may continue at operation 1904 with configuring the wireless device to transmit the one or more USREs in accordance with the resource allocation. For example, an apparatus of STAs 204 may configure the STAs 204 to transmit USRE 208 in accordance with the resource allocation of USTE 234. Moreover, an apparatus of STAs 304, 404, 504, 604, 704, 804, and STAs of FIGS. 15-18 may configure the correspond STAs to transmit the USRE in accordance with a resource allocation of USTE.

Figure 20:
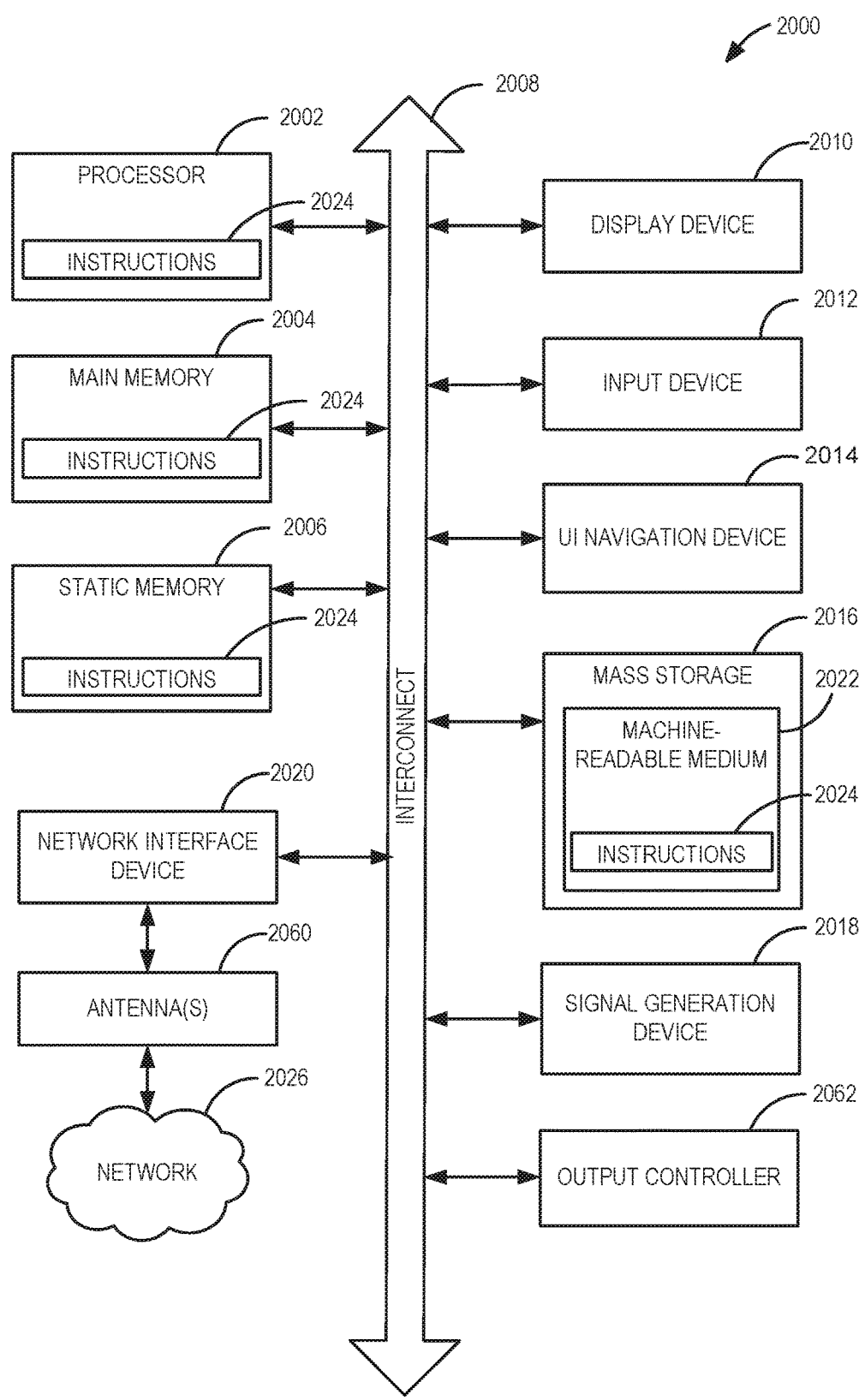
FIG. 20 illustrates a block diagram of an example machine upon which any one or more of the techniques (e.g., methodologies) discussed herein may perform.

FIG. 20 illustrates a block diagram of an example machine 2000 upon which any one or more of the techniques (e.g., methodologies) discussed herein may perform. In alternative embodiments, the machine 2000 may operate as a standalone device or may be connected (e.g., networked) to other machines. In a networked deployment, the machine 2000 may operate in the capacity of a server machine, a client machine, or both in server-client network environments. In an example, the machine 2000 may act as a peer machine in peer-to-peer (P2P) (or other distributed) network environment. The machine 2000 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2000 may include a hardware processor 2002 (e.g., a central processing unit (CPU), a graphics processing unit (GPU), a hardware processor core, or any combination thereof), a main memory 2004 and a static memory 2006, some or all of which may communicate with each other via an interlink (e.g., bus) 2008. The machine 2000 may further include a display device 2010, an input device 2012 (e.g., a keyboard), and a user interface (UI) navigation device 2014 (e.g., a mouse). In an example, the display device 2010, input device 2012 and UI navigation device 2014 may be a touch screen display. The machine 2000 may additionally include a mass storage (e.g., drive unit) 2016, a signal generation device 2018 (e.g., a speaker), a network interface device 2020, and one or more sensors 2021, such as a global positioning system (GPS) sensor, compass, accelerometer, or other sensor. The machine 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 2002 and/or instructions 2024 may comprise processing circuitry and/or transceiver circuitry.

The storage device 2016 may include a machine readable medium 2022 on which is stored one or more sets of data structures or instructions 2024 (e.g., software) embodying or utilized by any one or more of the techniques or functions described herein. The instructions 2024 may also reside, completely or at least partially, within the main memory 2004, within static memory 2006, or within the hardware processor 2002 during execution thereof by the machine 2000. In an example, one or any combination of the hardware processor 2002, the main memory 2004, the static memory 2006, or the storage device 2016 may constitute machine readable media.

While the machine readable medium 2022 is illustrated as a single medium, the term "machine readable medium" may include a single medium or multiple media (e.g., a centralized or distributed database, and/or associated caches and servers) configured to store the one or more instructions 2024.

An apparatus of the machine 2000 may be one or more of a hardware processor 2002 (e.g., a central processing unit (CPU), a graphics processing unit (GPU), a hardware processor core, or any combination thereof), a main memory 2004 and a static memory 2006, some or all of which may communicate with each other via an interlink (e.g., bus) 2008.

The term "machine readable medium" may include any medium that is capable of storing, encoding, or carrying instructions for execution by the machine 2000 and that cause the machine 2000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically. Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 2024 may further be transmitted or received over a communications network 2026 using a transmission medium via the network interface device 2020 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 2020 may include one or more physical jacks (e.g., Ethernet, coaxial, or phone jacks) or one or more antennas to connect to the communications network 2026. In an example, the network interface device 2020 may include one or more antennas 2060 to wirelessly communicate using at least one of single-input multiple-output (SIMO), multiple-input multiple-output (MIMO), or multiple-input single-output (MISO) techniques. In some examples, the network interface device 2020 may wirelessly communicate using Multiple User MIMO techniques. The term "transmission medium" shall be taken to include any intangible medium that is capable of storing, encoding or carrying instructions for execution by the machine 2000, and includes digital or analog communications signals or other intangible medium to facilitate communication of such software.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a wireless device comprising: memory; and processing circuitry coupled to the memory, the processing circuitry configured to: encode an uplink sounding trigger element (USTE) for one or more stations, the USTE comprising one or more uplink (UL) resource allocations for the one or more stations to transmit one or more uplink sounding referee elements (USREs) to the wireless device; configure the wireless device to transmit the USTE to the one or more stations; and decode the one or more USREs from the one or more station, where the one or more USREs are to be received by the access point in accordance with a corresponding resource allocation indicated in the USTE.

In Example 2, the subject matter of Example 1 optionally includes where the USTE is one from the following group: a trigger frame with a type of USTE, a dedicated USTE frame, an information element, and fields that are part of another information element.

In Example 3, the subject matter of any one or more of Examples 1-2 optionally include where the resource allocations are for one or both of orthogonal frequency division multiple access (OFDMA) and multiple-user (MU) multiple-input multiple-output (MIMO).

In Example 4, the subject matter of any one or more of Examples 1-3 optionally include where the processing circuitry is further configured to: determine a second resource allocation for multi-user (MU) UL data or USREs in accordance with one or both of orthogonal frequency division multiple access (OFDMA) and multiple-user (MU) multiple-input multiple-output (MIMO) based on the USREs.

In Example 5, the subject matter of any one or more of Examples 1-4 optionally include where the USREs are one from the following group: high-efficiency long training fields (HE-LTFs) and null data packets (NDPs).

In Example 6, the subject matter of any one or more of Examples 1-5 optionally include where the processing circuitry is further configured to: encode the USTE to comprise one or more second UL resource allocations for at least one of the one or more stations to transmit an UL sounding feedback (USF) to the wireless device; and decode at least one USFs or UL data from the at least one of the one or more stations, where the at least one USFs is to be transmitted in accordance with the one or more second UL resource allocations indicated in the USTE.

In Example 7, the subject matter of any one or more of Examples 1-6 optionally include where the processing circuitry is further configured to: configure the wireless device to transmit a null data packet in the one or more second UL resource allocations.

In Example 8, the subject matter of any one or more of Examples 1-7 optionally include where the processing circuitry is further configured to: encode a second USTE to comprise one or more second UL resource allocations for at least one of the one or more stations to transmit an UL sounding feedback (USF) or an UL data to the wireless station; configure the wireless device to transmit the second USTE; and decode at least one USFs or UL data from the at least one of the one or more stations, where the at least one USFs or the at least one UL data is to be transmitted in accordance with the one or more second UL resource allocations.

In Example 9, the subject matter of Example 8 optionally includes where the processing circuitry is further configured to: determine a second resource allocation for multi-user (MU) UL, data in accordance with one or both of orthogonal frequency division multiple access (OFDMA) and multiple-user (MU) multiple-input multiple-output (MIMO) based on the USREs and the at least one USFs.

In Example 10, the subject matter of any one or more of Examples 8-9 optionally include where the USF comprises one or more of the following group: a signal to noise ratio, a received signal strength, a feedback or steering matrix, and channel state information (CSI).

In Example 11, the subject matter of any one or more of Examples 8-10 optionally include where the processing circuitry is further configured to: encode the second USTE to comprise an USF information element including a common information field for each of the one or more stations and one or more station fields for a corresponding station of the one or more stations.

In Example 12, the subject matter of any one or more of Examples 1-11 optionally include where the processing circuitry is further configured to: encode the USRE to comprise one or more second UL resource allocations for at least one of the one or more stations to transmit an UL data to the wireless station; and decode at least one UL data from the at least one of the one or more stations, where the at least one USFs or the at least one UL data is to be transmitted in accordance with the one or more second UL resource allocations.

In Example 13, the subject matter of any one or more of Examples 1-12 optionally include where the processing circuitry is further configured to: encode the USTE to comprise an USRE information element (USREIE) including a common information field including fields for each of the one or more stations and one or more station fields for a corresponding station of the one or more stations.

In Example 14, the subject matter of any one or more of Examples 1-13 optionally include where the wireless device and each of the one or more stations are each one from the following group: an Institute of Electrical and Electronic Engineers (IEEE) 14 is missing parent: 14 is missing parent: 802.11ax access point, an IEEE 802.1 1ax station, an IEEE 14 is missing parent: 14 is missing parent: 802.11 station, and an IEEE 802.11 access point.

in Example 15, the subject matter of any one or more of Examples 1-14 optionally include transceiver circuitry coupled to the processing circuitry.

In Example 16, the subject matter of any one or more of Examples 14-15 optionally include one or more antennas coupled to the transceiver circuitry.

Example 17 is a non-transitory computer-readable storage medium that stores instructions for execution by one or more processors, the instructions to configure the one or more processors to cause a wireless device to: encode an uplink sounding trigger element (USTE) for one or more stations, the USTE including one or more uplink (UL) resource allocations for the one or more stations to transmit one or more uplink sounding referee elements (USREs) to the wireless device; configure the wireless device to transmit the USTE to the one or more stations; and decode the one or more USREs from the one or more station, where the one or more USREs are to be received by the access point in accordance with a corresponding resource allocation indicated in the USTE.

In Example 18, the subject matter of Example 17 optionally includes where the resource allocations are for one or both of orthogonal frequency division multiple access (OFDMA) and multiple-user (MU) multiple-input multiple-output (MIMO).

In Example 19, the subject matter of any one or more of Examples 17-18 optionally include where the instructions further configure the one or more processors to cause the wireless device to: encode the USTE to comprise one or more second UL resource allocations for at least one of the one or more stations to transmit an UL sounding feedback (USF) to the wireless station; and decode at least one USFs or UL data from the at least one of the one or more stations, where the at least one USFs is to be transmitted in accordance with the one or more second UL resource allocations.

Example 20 is a method performed by a wireless device, the method including: encoding an uplink sounding trigger element (USTE) for one or more stations, the USTE including one or more uplink (UL) resource allocations for the one or more stations to transmit one or more uplink sounding referee elements (USREs) to the wireless device; configuring the wireless device to transmit the USTE to the one or more stations; and decoding the one or more USREs from the one or more station, where the one or more USREs are to be received by the access point in accordance with a corresponding resource allocation indicated in the USTE.

In Example 21, the subject matter of Example 20 optionally includes encoding the USTE to comprise one or more second UL resource allocations for at least one of the one or more stations to transmit an UL sounding feedback (USF) to the wireless station; and decoding at least one USFs or UL data from the at least one of the one or more stations, where the at least one USFs is to be transmitted in accordance with the one or more second UL resource allocations.

Example 22 is an apparatus of a station including: memory; and processing circuitry coupled to the memory, the processing circuitry configured to: decode an uplink sounding trigger element (USTE), the USTE including an uplink (UL) resource allocation for the station to transmit one or more uplink sounding referee elements (USREs) to a wireless device; and configure the wireless device to transmit the one or more USREs in accordance with the resource allocation.

In Example 23, the subject matter of Example 22 optionally includes where the USTE further comprises a second UL resource allocation for the station to transmit an UL sounding feedback (USF) to the wireless device, and where the processing circuitry is further configured to: encode the USF based on one or more frames received from the wireless device; and configure the station to transmit the USF in accordance with the second UL resource allocation to the wireless device.

In Example 24, the subject matter of any one or more of Examples 22-23 optionally include where the resource allocations are for one or both of orthogonal frequency division multiple access (OFDMA) and multiple-user (MU) multiple-input multiple-output (MIMO).

In Example 25, the subject matter of any one or more of Examples 22-24 optionally include transceiver circuitry coupled to the processing circuitry, and, one or more antennas coupled to the transceiver circuitry.

Example 26 is an apparatus of a wireless device including: means for encoding an uplink sounding trigger element (USTE) for one or more stations, the USTE including one or more uplink (UL) resource allocations for the one or more stations to transmit one or more uplink sounding referee elements (USREs) to the wireless device; means for configuring the wireless device to transmit the USTE to the one or more stations; and decode the one or more USREs from the one or more station, where the one or more USREs are to be received by the access point in accordance with a corresponding resource allocation indicated in the USTE.

In Example 27, the subject matter of Example 26 optionally includes where the USTE is one from the following group: a trigger frame with a type of USTE, a dedicated USTE frame, an information element, and fields that are part of another information element.

In Example 28, the subject matter of any one or more of Examples 26-27 optionally include where the resource allocations are for one or both of orthogonal frequency division multiple access (OFDMA) and multiple-user (MU) multiple-input multiple-output (MIMO).

In Example 29, the subject matter of any one or more of Examples 26-28 optionally include means for determining a second resource allocation for multi-user (MU) UL data or USREs in accordance with one or both of orthogonal frequency division multiple access (OFDMA) and multiple-user (MU) multiple-input multiple-output (MIMO) based on the USREs.

In Example 30, the subject matter of any one or more of Examples 26-29 optionally include where the USREs are one from the following group: high-efficiency long training fields (HE-LTFs) and null data packets (NDPs).

In Example 31, the subject matter of any one or more of Examples 26-30 optionally include means for encoding the USTE to comprise one or more second UL resource allocations for at least one of the one or more stations to transmit an UL sounding feedback (USF) to the wireless device; and means for decoding at least one USFs or UL data from the at least one of the one or more stations, where the at least one USFs is to be transmitted in accordance with the one or more second UL resource allocations indicated in the USTE.

In Example 32, the subject matter of any one or more of Examples 26-31 optionally include means for configuring the wireless device to transmit a null data packet in the one or more second UL resource allocations.

In Example 33, the subject matter of any one or more of Examples 1-32 optionally include means for encoding a second USTE to comprise one or more second UL resource allocations for at least one of the one or more stations to transmit an UL sounding feedback (USF) or an UL data to the wireless station; means for configuring the wireless device to transmit the second USTE; and means for decoding at least one USFs or UL data from the at least one of the one or more stations, where the at least one USFs or the at least one UL data is to be transmitted in accordance with the one or more second UL resource allocations.

In Example 34, the subject matter of Example 33 optionally includes means for determining a second resource allocation for multi-user (MU) UL data in accordance with one or both of orthogonal frequency division multiple access (OFDMA) and multiple-user (MU) multiple-input multiple-output (MIMO) based on the USREs and the at least one USFs.

In Example 35, the subject matter of any one or more of Examples 33-34 optionally include where the USF comprises one or more of the following group: a signal to noise ratio, a received signal strength, a feedback or steering matrix, and channel state information (CSI).

In Example 36, the subject matter of any one or more of Examples 33-35 optionally include means for encoding the second USTE to comprise an USF information element including a common information field for each of the one or more stations and one or more station fields for a corresponding station of the one or more stations.

In Example 37, the subject matter of any one or more of Examples 26-36 optionally include means for encoding the USRE to comprise one or more second UL resource allocations for at least one of the one or more stations to transmit an UL data to the wireless station; and means for decoding at least one UL data from the at least one of the one or more stations, where the at least one USFs or the at least one UL data is to be transmitted in accordance with the one or more second UL resource allocations.

In Example 38, the subject matter of any one or more of Examples 26-37 optionally include means for encoding the USTE to comprise an USRE information element (USREIE) including a common information field including fields for each of the one or more stations and one or more station fields for a corresponding station of the one or more stations.

In Example 39, the subject matter of any one or more of Examples 26-38 optionally include where the wireless device and each of the one or more stations are each one from the following group: an Institute of Electrical and Electronic Engineers (IEEE) 39 is missing parent: 39 is missing parent: 802.11 ax access point, an IEEE 802.11ax station, an IEEE 39 is missing parent: 39 is missing parent: 802.11 station, and an IEEE 802.11 access point.

In Example 40, the subject matter of any one or more of Examples 26-39 optionally include means for transmitting and receiving radio waves.

Example 41 is a method performed by a station, the method including: decoding an uplink sounding trigger element (USTE), the USTE including an uplink (UL) resource allocation for the station to transmit one or more uplink sounding referee elements (USREs) to a wireless device; and configuring the wireless device to transmit the one or more USREs in accordance with the resource allocation.

In Example 42, the subject matter of Example 41 optionally includes where the USTE further comprises a second UL resource allocation for the station to transmit an UL sounding feedback (USF) to the wireless device, and the method further including: encoding the USF based on one or more frames received from the wireless device; and configuring the station to transmit the USF in accordance with the second UL resource allocation to the wireless device.

In Example 43, the subject matter of any one or more of Examples 41-42 optionally include where the resource allocations are for one or both of orthogonal frequency division multiple access (OFDMA) and multiple-user (MU) multiple-input multiple-output (MIMO).

Example 44 is a non-transitory computer-readable storage medium that stores instructions for execution by one or more processors of a station, the instructions to configure the one or more processors to cause the station to: decode an uplink sounding trigger element (USTE), the USTE including an uplink (UL) resource allocation for the station to transmit one or more uplink sounding referee elements (USREs) to a wireless device; and configure the wireless device to transmit the one or more USREs in accordance with the resource allocation.

In Example 45, the subject matter of Example 44 optionally includes where the USTE further comprises a second UL resource allocation for the station to transmit an UL sounding feedback (USF) to the wireless device, and where the instructions are to further configure the one or more processors to cause the station to: encode the USF based on one or more frames received from the wireless device; and configure the station to transmit the USF in accordance with the second UL resource allocation to the wireless device.

In Example 46, the subject matter of any one or more of Examples 44-45 optionally include where the resource allocations are for one or both of orthogonal frequency division multiple access (OFDMA) and multiple-user (MU) multiple-input multiple-output (MIMO).

Example 47 is an apparatus of a station, the apparatus including: means for decoding an uplink sounding trigger element (USTE), the USTE including an uplink (UL) resource allocation for the station to transmit one or more uplink sounding referee elements (USREs) to a wireless device; and means for configuring the wireless device to transmit the one or more USREs in accordance with the resource allocation.

In Example 48, the subject matter of Example 47 optionally includes where the USTE further comprises a second UL resource allocation for the station to transmit an UL sounding feedback (USF) to the wireless device, and further including: means for encoding the USF based on one or more frames received from the wireless device; and means for configuring the station to transmit the USF in accordance with the second UL resource allocation to the wireless device.

In Example 49, the subject matter of any one or more of Examples 47-48 optionally include where the resource allocations are for one or both of orthogonal frequency division multiple access (OFDMA) and multiple-user (MU) multiple-input multiple-output (MIMO).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device comprising: memory; and
processing circuitry coupled to the memory, the processing circuity configured to:
encode an uplink sounding trigger element (USTE) for two or more stations, the USTE comprising two or more first uplink (UL) resource allocations for the two or more stations to transmit two or more uplink sounding referee elements (USREs) to the wireless device, wherein the USREs are high-efficiency long training fields (HE-LTFs) or null data packets (NDPs), wherein the two or more first UL resource allocations comprise a bandwidth for a corresponding station of the two or more stations to transmit a corresponding USRE of the two or more USREs and an indication of when the corresponding station is to transmit the corresponding USRE;
configure the wireless device to transmit the USTE to the two or more stations;
decode the two or more USREs from the two or more stations, wherein the two or more USREs are to be received by the wireless device in accordance with a corresponding resource allocation indicated in the USTE; and
determine second UL resource allocations for at least one station of the two or more stations for multi-user (MU) UL data in accordance with one or both of orthogonal frequency division multiple access (OFDMA) and multiple-user (MU) multiple-input multiple-output (MIMO) based on the decoded two or more USREs.

2. The apparatus of claim 1, wherein the USTE is one from the following group: a trigger frame with a type of USTE, a dedicated USTE frame, an information element, and fields that are part of another information element.

3. The apparatus of claim 1, wherein the processing circuitry is further configured to:
encode the USTE to comprise third UL resource allocations for at least one of the two or more stations to transmit an UL sounding feedback (USF) to the wireless device; and
decode in accordance with the third UL resource allocations at least one USFs or UL data from the at least one of the two or more stations.

4. The apparatus of claim 1, wherein the processing circuitry is further configured to:
encode another USTE to comprise the second UL resource allocations;
configure the wireless device to transmit the another USTE; and decode in accordance with the second UL resource allocations at least one USFs or UL data from the at least one station of the two or more stations.

5. The apparatus of claim 4, wherein the USF comprises one or more of the following group: a signal to noise ratio, a received signal strength, a feedback or steering matrix, and channel state information (CSI).

6. The apparatus of claim 4, wherein the processing circuitry is further configured to:
encode the another USTE to comprise an USF information element comprising a common information field for each of the one or more stations and one or more station fields for a corresponding station of the one or more stations.

7. The apparatus of claim 1, wherein the processing circuitry is further configured to:
encode the USRE to comprise one or more second UL resource allocations for at least one of the two or more stations to transmit an UL data to the wireless station; and
decode in accordance with the one or more second UL resource allocations at least one UL data from the at least one of the two or more stations.

8. The apparatus of claim 1, wherein the processing circuitry is further configured to:
encode the USTE to comprise an USRE information element (USREIE) comprising a common information field comprising fields for each of the one or more stations and one or more station fields for a corresponding station of the two or more stations.

9. The apparatus of claim 1, wherein the wireless device and each of the one or more stations are each one from the following group: an Institute of Electrical and Electronic Engineers (IEEE) 802.11ax access point, an IEEE 802.11ax station, an IEEE 802.11 station, and an IEEE 802.11 access point.

10. The apparatus of claim 1, further rising transceiver circuitry coupled to the processing circuitry.

11. The apparatus of claim 10, further comprising one or more antennas coupled to the transceiver circuitry.

12. A non-transitory computer-readable storage medium that stores instructions for execution by one or more processors, the instructions to configure the one or more processors to:
processing circuitry coupled to the memory, the processing circuity configured to:
encode an uplink sounding trigger element (USTE) for two or more stations, the USTE comprising two or more first uplink (UL) resource allocations for the two or more stations to transmit two or more uplink sounding referee elements (USREs) to the wireless device, wherein the USREs are high-efficiency long training fields (HE-LTF's) or null data packets (NDPs), wherein the two or more first UL resource allocations comprise a bandwidth for a corresponding station of the two or more stations to transmit a corresponding USRE of the two or more USREs and an indication of when the corresponding station is to transmit the corresponding USRE;
configure the wireless device to transmit the USTE to the two or more stations;
decode the two or more USREs from the two or more stations, wherein the two or more USREs are to be received by the wireless device in accordance with a corresponding resource allocation indicated in the corresponding USTE; and
determine second UL resource allocations for at least one station of the two or more stations for multi-user (MU) UL data in accordance with one or both of orthogonal frequency division multiple access (OFDMA) and multiple-user (MU) multiple-input multiple-output (MIMO) based on the decoded two or more USREs.

13. The non-transitory computer-readable storage medium of claim 12, wherein the instructions further configure the one or more processors to:
encode the USRE to comprise one or more second UL resource allocations for at least one of the two or more stations to transmit an UL data to the wireless station; and
decode in accordance with the one or more second UL resource allocations at least one UL data from the at least one of the two or more stations.

14. A method performed by a wireless device, the method comprising:
encoding an uplink sounding trigger element (USTE) for two or more stations, the USTE comprising two or more first uplink (UL) resource allocations for the two or more stations to transmit two or more uplink sounding referee elements (USREs) to the wireless device, wherein the USREs are high-efficiency long training fields (HE-LTFs) or null data packets (NDPs), wherein the two or more first UL resource allocations comprise a bandwidth for a corresponding station of the two or more stations to transmit a corresponding USRE of the two or more USREs and an indication of when the corresponding station is to transmit the corresponding USRE;
configuring the wireless device to transmit the USTE to the two or more stations;
decoding the two or more USREs from the two or more stations, wherein the two or more USREs are to be received by the wireless device in accordance with a corresponding resource allocation indicated in the corresponding USTE; and
determining second UL resource allocations for at least one station of the two or more stations for multi-user (MU) UL data in accordance with one or both of orthogonal frequency division multiple access (OFDMA) and multiple-user (MU) multiple-input multiple-output (MIMO) based on the decoded two or more USREs.

15. The method of claim 14, further comprising:
encoding the USRE to comprise one or more second UL resource allocations for at least one of the two or more stations to transmit an UL data to the wireless station; and
decoding in accordance with the one or more second UL resource allocations at least one UL data from the at least one of the two or more stations.

16. An apparatus of a station comprising: memory; and processing circuitry coupled to the memory, the processing circuity configured to:
decode an uplink sounding trigger element (USTE), the USTE comprising an uplink (UL) resource allocation for the station to transmit one or more uplink sounding referee elements (USREs) to a wireless device, wherein each USREs of the one or more USREs comprises a high-efficiency long training field (HE-LTF), wherein the UL resource allocation comprises a bandwidth to transmit the HE-LTF and an indication of when the station is to transmit the one or more USREs; and configure the wireless device to transmit the one or more USREs in accordance with the resource allocation, wherein the one or more USREs are HE-LTFs;

decode a second UL resource allocation for the station to transmit UL data to the wireless device; and configure the station to transmit a data frame in accordance with the second UL resource allocation to the wireless device.

17. The apparatus of claim 16, wherein the USTE further comprises a another UL resource allocation for the station to transmit an UL sounding feedback (USF) to the wireless device, and wherein the processing circuitry is further configured to:

encode the USF based on one or more frames received from the wireless device; and configure the station to transmit the USF in accordance with the second UL resource allocation to the wireless device.

18. The apparatus of claim 16, wherein the resource allocations are for one or both of orthogonal frequency division multiple access (OFDMA) and multiple-user (MU) multiple-input multiple-output (MIMO).

19. The apparatus of claim 16, further comprising transceiver circuitry coupled to the processing circuitry; and, one or more antennas coupled to the transceiver circuitry.

* * * * *